United States Patent [19]

Udaka et al.

[11] Patent Number: 5,764,401
[45] Date of Patent: Jun. 9, 1998

[54] OPTICAL APPARATUS

[75] Inventors: Tohru Udaka, Kanagawa; Hideharu Miyagaki, Chiba; Kazuhiro Noda; Koichiro Hinokuma, both of Kanagawa, all of Japan

[73] Assignee: Sony Corporation, Tokyo, Japan

[21] Appl. No.: 555,813

[22] Filed: Nov. 9, 1995

[30] Foreign Application Priority Data

| Nov. 11, 1994 | [JP] | Japan | 6-303250 |
| Nov. 11, 1994 | [JP] | Japan | 6-303251 |
| Mar. 20, 1995 | [JP] | Japan | 7-087549 |
| Jun. 2, 1995 | [JP] | Japan | 7-159842 |

[51] Int. Cl.⁶ .................................... G02F 1/153
[52] U.S. Cl. ............................ 359/270; 359/272
[58] Field of Search .................... 359/270, 265, 359/272

[56] References Cited

U.S. PATENT DOCUMENTS

| 4,013,343 | 3/1977  | Jaccard et al.       | 359/270 |
| 4,240,717 | 12/1980 | Camlibel et al.      | 359/297 |
| 4,332,440 | 6/1982  | DiDomenico, Jr. et al.| 359/270 |
| 4,427,267 | 1/1984  | Collins et al.       | 359/270 |
| 4,750,817 | 6/1988  | Sammells             | 359/270 |
| 4,828,369 | 5/1989  | Hotomi               | 359/270 |
| 5,280,381 | 1/1994  | Mason                | 359/270 |

FOREIGN PATENT DOCUMENTS

A-0 064 912  11/1982  European Pat. Off. .
A-0 495 220   7/1992  European Pat. Off. .
A-2 352 261  12/1977  France .

OTHER PUBLICATIONS

Patent Abstracts of Japan, vol. 011, No. 121 (P–568), Nov. 26, 1986 and JP-6-61 267033 (Sharp Corp.).

Patent Abstracts of Japan, vol. 007, No. 164 (P–211), May 20, 1985 and JP-A-58 072 930 (Tokyo Shibaura).

Primary Examiner—Georgia Y. Epps
Assistant Examiner—Evelyn A. Lester
Attorney, Agent, or Firm—Hill & Simpson

[57] ABSTRACT

An optical apparatus includes a first electrode that can be kept in a transparent state in a visible light region, and a second electrode electrically separated from the first electrode. A space is provided between the first and second electrodes. A certain function is used to provide a driving potential to the first and second electrodes. An electrolyte is poured into the space between the electrodes. The electrolyte is composed of a solution prepared by dissolving a silver salt in at least one type of solvent selected from a group consisting of dimethylformamide, diethylformamide, N, N-dimethylacetamide, N-methylpropionamide, N-methylpyrrolidone, 2-ethoxyethanol, and 2-methoxyethanol. By use of this electrolyte, silver is precipitated and dissolved under driving control over the first and second electrodes. As a result, color-developing and color-fading are effected by precipitation and dissolution of silver, respectively.

22 Claims, 32 Drawing Sheets

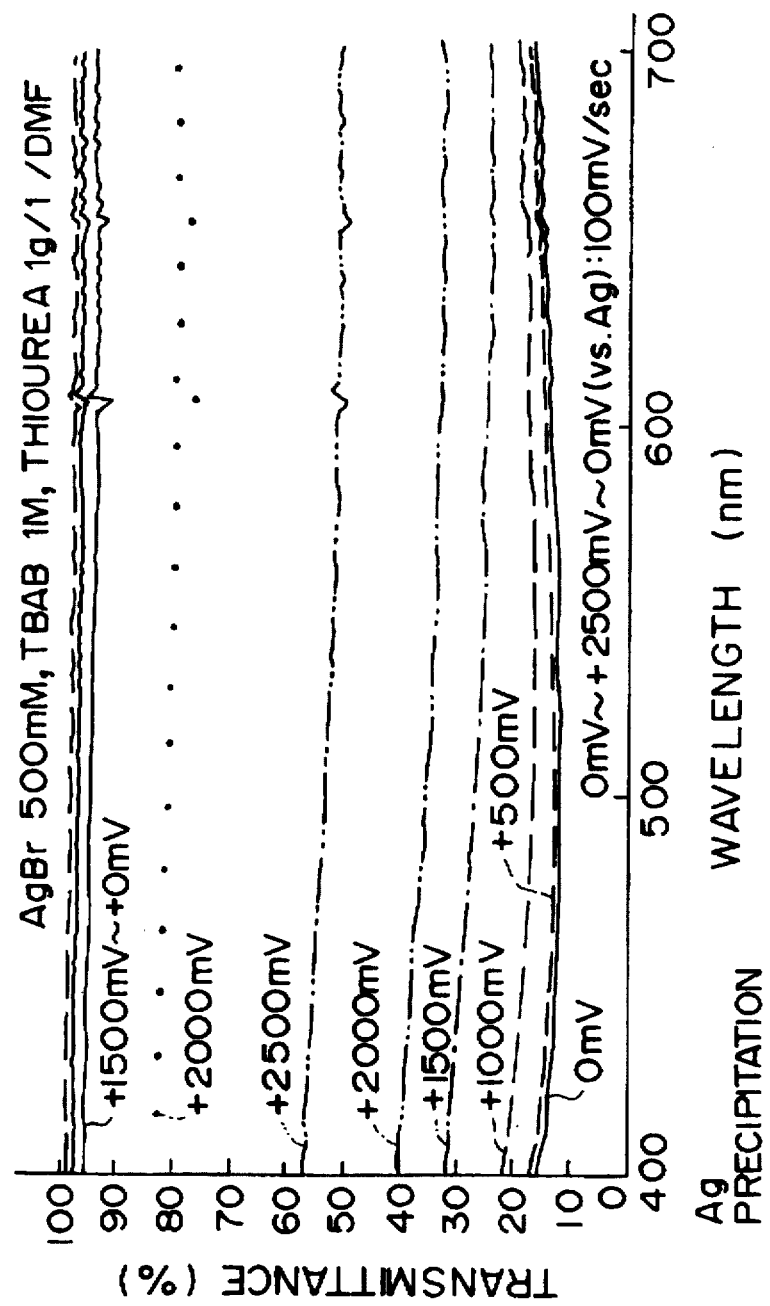

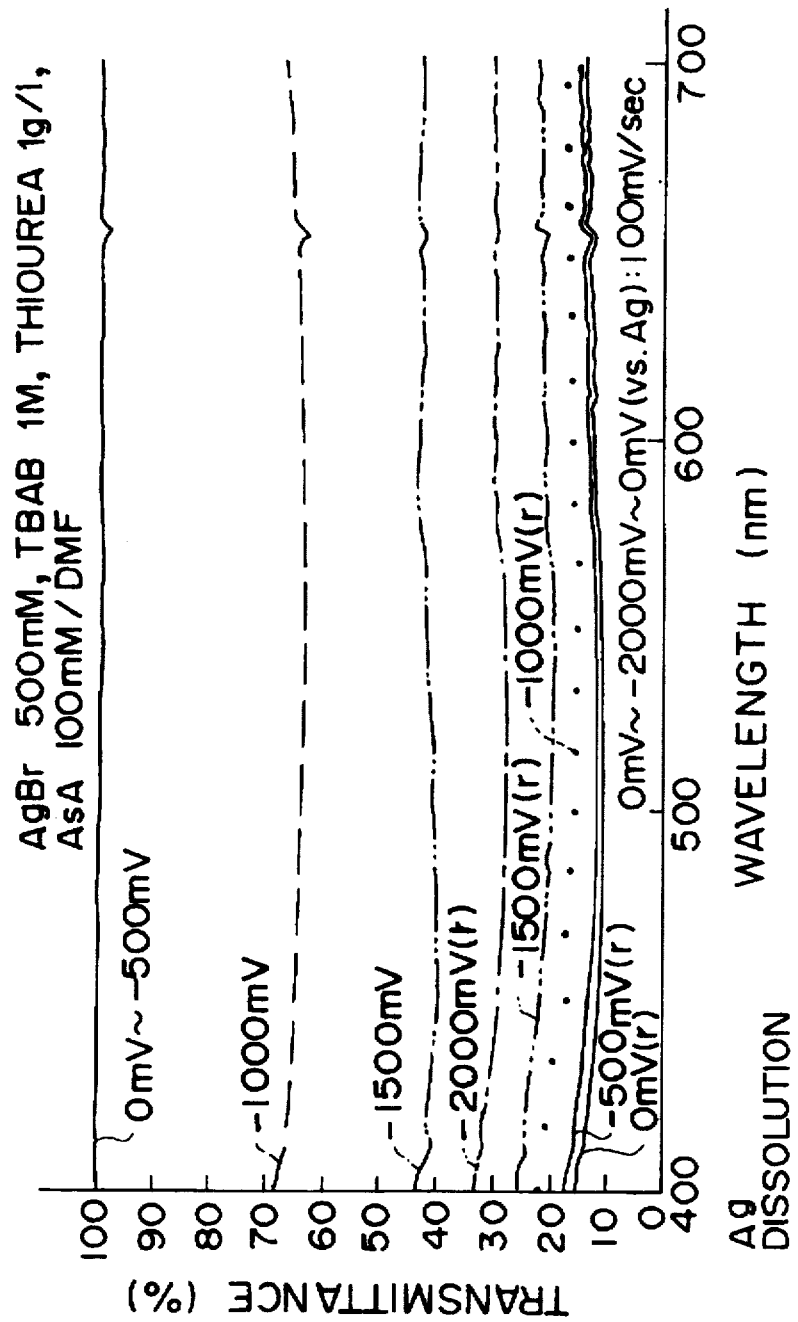

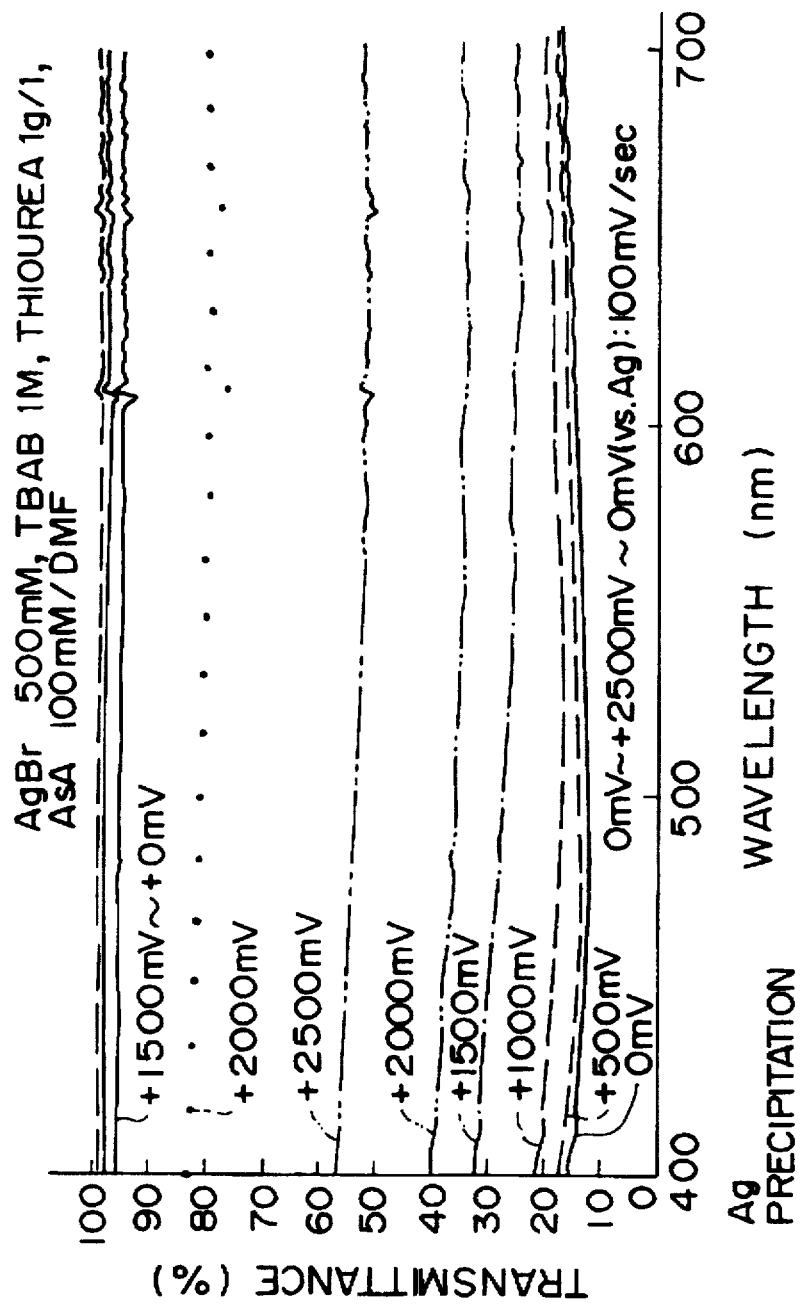

OPTICAL APPARATUS

BACKGROUND OF THE INVENTION

1. Field of the Invention

The present invention relates to an optical apparatus, such as an optical filter or the like, for example, an optical filter that is capable of controlling light transmittance in the visible light region (wavelength range of from 400 to 700 nm), or an optical filter applicable to a display for displaying numerics, characters or X–Y matrixes.

2. Description of the Related Art

Hitherto, electrochromic materials (hereinafter referred to as "EC materials") are used for a voltage-driven display, for example, for a digital clock/watch for indicating time.

Electrochromic display devices (hereinafter referred to as "ECD") are non-luminous displays that are operable through use of reflected light or transmitted light, whereby the operator feels less fatigue even after looking at the display for a long time. Also, ECD can be operated with a relatively lower driving voltage and requires less power consumption. For example, the following type of liquid ECD is known, as disclosed in Japanese Patent Laid-Open No. 59-24879. That is, an organic-type viologen molecular derivative that reversibly effects color-developing and color-fading is used as an EC material for the ECD.

Along with the development of precision optical apparatuses, there is a need for miniscule and low-powered light amount adjusting devices that can replace conventional variable ND filters. It is necessary, however, to examine whether the above-described ECD or peripheral technique is applicable to such devices.

Since the conventional EC materials for use in displays are only required for producing a single color, they do not satisfy the need discussed above. Additionally, the conventional EC materials do not meet the demand for the ability to control the light transmittance in the visible light region (a wavelength range from 400 to 700 nm), which is required for light amount-adjusting devices.

SUMMARY OF THE INVENTION

Accordingly, it is an object of the present invention to provide a low-powered optical filter which is capable of controlling light transmittance in a visible light region and which also has good low-temperature characteristics.

In order to achieve the above object, there is provided an optical apparatus comprising: a first electrode being kept in a transparent state in a visible light region; a second electrode being electrically separated from the first electrode; a space being provided between the first and second electrodes; means for providing a driving potential to the first and second electrodes; and an electrolyte being poured into the space, the electrolyte being composed of a solution prepared by dissolving a silver salt in at least one type of solvent selected from a group consisting of dimethylformamide, diethylformamide, N,N-dimethylacetamide, N-methylpropionamide, N-methylpyrrolidone, 2-ethoxyethanol, and 2-methoxyethanol, whereby silver is precipitated and dissolved under driving control over the first and second electrodes so as to effect color-developing and color-fading by precipitation and dissolution of silver, respectively.

BRIEF DESCRIPTION OF THE DRAWINGS

FIG. 31 illustrates spectral characteristics indicating a change in transmittance caused by applying voltages when color-fading of the same optical filter is effected;

FIG. 32 illustrates spectral characteristics indicating a change in transmittance caused by applying voltages when color-developing of a further optical filter according to the present invention is effected; and FIG. 33 illustrates spectral characteristics indicating a change in transmittance caused by applying voltages when color-fading of the same optical filter is effected.

DESCRIPTION OF THE PREFERRED EMBODIMENTS

Figure 1:
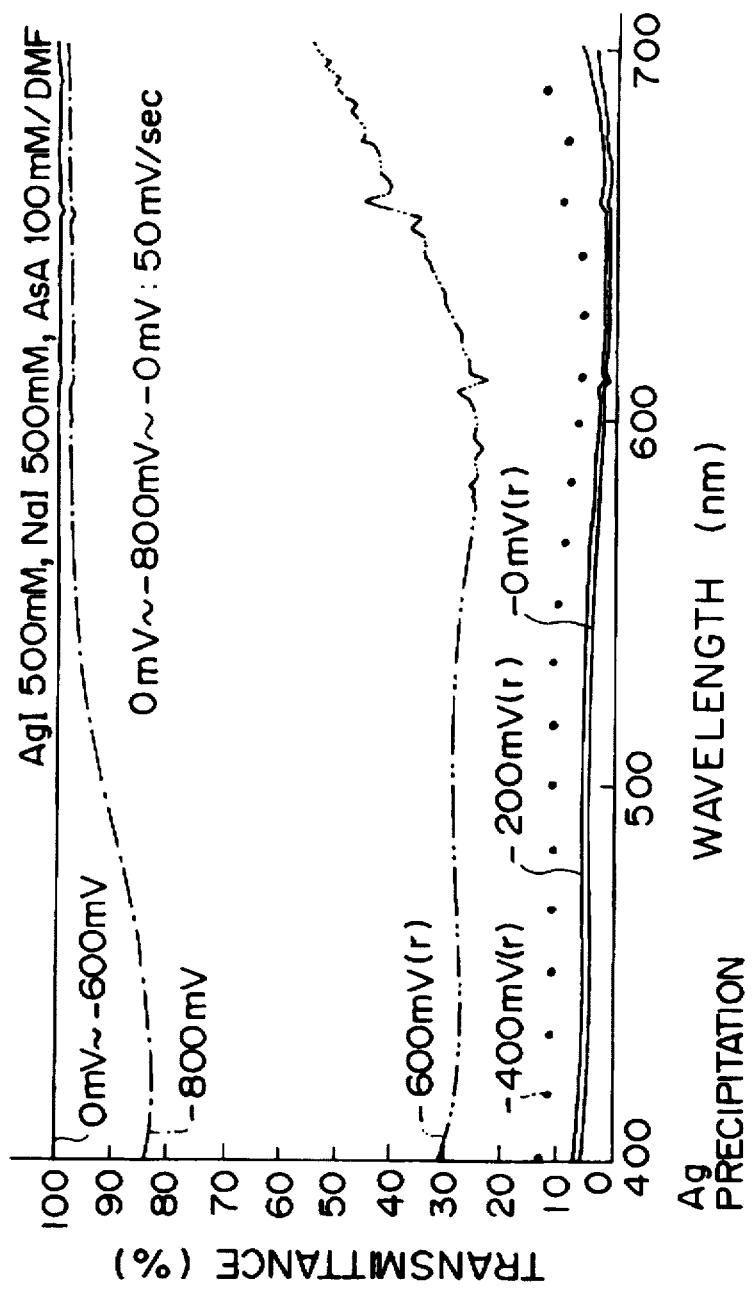
FIG. 1 illustrates spectral characteristics indicating a change in transmittance caused by applying voltages when color-developing of an optical filter according to the present invention is effected.

According to the present invention, a solution is formed by use of a silver (complex) salt so that it does not exert absorption power in a visible light region (a wavelength range from 400 to 700 nm) and can shield light substantially uniformly in the visible light region when color-developing is effected. Also, this silver (complex) salt is rich in reversible properties of precipitation-dissolution under driving control. The silver (complex) salt has a considerably large precipitation potential in the negative direction, in comparison with organic EC materials. It is thus necessary that a large potential be not applied to a reduction side so as not to cause damage to transparent electrodes.

In this manner, according to the present invention, a reversible system, in particular, a non-aqueous reversible system, which causes silver to be precipitated on the transparent electrode from a silver (complex) salt and be dissolved, is employed, whereby a non-luminous and low-powered optical filter suitable for the visible light region can be provided.

Silver (complex) salts usable for the present invention, preferably but not specifically, include silver thiocyanide (AgSCN) and silver halides (AgX: X indicates halogen atoms, such as F, Cl, Br, I and the like), such salts being rich in reversible properties. This type of salt is dissolved in a non-aqueous solution of the present invention so as to prepare a RED (Reversible Electro Deposition) material-containing solution (hereinafter referred to as "a RED solution). This solution is poured between working electrodes.

If silver thiocyanide is used, potassium ferrocyanide serving as an auxiliary oxidation-reduction system is preferably added to the silver thiocyanide for enhancing the reversible properties of the precipitation of silver from the resulting solution and the dissolution thereto. The concentration of the potassium ferrocyanide is preferably in a range of from 0.005 to 0.010 mol/liter.

A cyanide solution, such as AgC or the like, used in a plating bath, is conventionally well known for the precipitation of silver from a silver (complex) salt. However, the use of cyanide solution jeopardizes safe working conditions and makes it difficult to dispose the resulting liquid waste. In order to avoid such problems, in the present invention a non-cyanide silver salt is used.

It is desirable that the above non-aqueous solvent type RED solution containing silver halide at a concentration in a range from 0.05 to 2.0 mol/liter be used.

In this invention, a silver (complex) salt that can attain substantially uniform light shielding power in the visible light region is used as a RED material. In the process of the precipitation of silver from the silver (complex) salt and dissolution thereof, a solution may become cloudy due to by-products produced while the silver precipitated on the electrodes is dissolved, thus sometimes making it difficult to maintain high transparency of the solution.

This problem was considered, and it was then found that silver iodide (AgI) representing a silver (complex) salt is used as a RED material to generate iodine while the precipitated silver is dissolved, which iodine may disadvantageously make the solution cloudy. In order to solve this problem, a reducing agent is added to the silver salt so as to reduce the precipitated iodine into the form of ions, thereby preventing the solution from becoming cloudy in a yellowish color.

Thus, it is desirable that silver halide be dissolved in an RED solution and also that ascorbic acid and/or tin chloride be added as a reducing agent to the solution.

In particular, in a system obtained by using silver iodide and adding sodium iodide, ascorbic acid and/or tin chloride is/are preferably used as a reducing agent in order to suppress the precipitation of iodine that may be produced while the precipitated silver is dissolved, to inhibit a decrease in transmittance of the RED solution, and further to prevent a change in the bath composition caused by the generation of iodine. The ascorbic acid and/or the tin chloride is/are preferably added at a concentration in a range from one time to 20 times of the silver halide.

In the manner described above, it is desirable that the resulting RED solution have high reversible properties by the use of a combination of various silver (complex) salts and reducing agents. A study has been made of, on one hand, the use of ascorbic acid as a reducing agent and, on the other hand, only the use of non-aqueous solvent composed of dimethyl sulfoxide (DMSO). However, since DMSO has a freezing point at 18° C., the resultant RED solution has poor low-temperature characteristics so that it is easily solidified during the use in, for example, cold climates.

In view of the above problems, the present inventors were committed to a study of the use of the following type of solvent in a system using silver thiocyanide or silver halide that is rich in reversible properties compared to other silver (complex) salts. Namely, the solvent has dissolving power with respect to the above-described reducing agent used for effecting reversible precipitation and dissolution of silver and also has good low-temperature characteristics and a low freezing point. The present inventors then found that a non-aqueous solvent composed of at least one type of compounds selected from a group consisting of DMF, DEF, DMAA, MPA, MP, MEOH and EEOH according to the present invention would be extremely effective.

All of the non-aqueous solvent noted above have lower freezing points than DMSO (in particular, the freezing points of DMF, DEF, MEOH and EEOH are lower than DMSO by 70° C. or more). A RED solution prepared by dissolving a silver salt therein exhibits excellent low-temperature characteristics and thus sufficiently endures low temperatures, for example, in cold climates.

For the use of silver iodide or the like that is rich in reversible properties as the above-noted silver halide, a supporting salt, such as sodium iodide (NaI) or the like, is preferably added to the RED solution at a concentration in a range from one half to five times of silver iodide in order to increase electrical conductivity of the RED solution.

The supporting salt (supporting electrolyte) has the ability to provide halogen for the dissolution of the silver halide so as to transform the silver halide into a silver (complex) salt. The supporting salts include as sodium halide, potassium halide, calcium halide and quaternary ammonium salt halide.

The anion group of these supporting salts is preferably selected from a group consisting of a perchlorate ($ClO_4$) group, a bromine (Br) group, an idione (I) group, a hexafluorophosphate ($PF_6$) group and a tetrafluoroborate ($BF_4$) group.

Further, a chemical or physical modification may be made to transparent electrodes (in particular, ITO (Indium Tin Oxide) electrodes obtained from tin-doped indium oxide) serving as working electrodes used for the precipitation or the dissolution of silver, which functions as a filter material. This modification lowers the precipitation potential of silver on the transparent electrode so as to facilitate the precipitation and dissolution of silver, thereby reducing electrical damage to the transparent electrodes and the solution.

As a chemical modification, the following method is preferably employed. The ITO electrodes are surface-treated (chemically plated) by palladium according to a two-stage solution treatment method in which the electrodes are soaked in a tin solution and in a palladium solution. That is, as a surface activating treatment performed on the ITO electrodes by use of palladium, a palladium nucleus is precipitated on a non-treated ITO substrate so as to enhance activation on the surface of the ITO electrode.

For performing this activating treatment, a tin solution obtained by dissolving 0.10 to 1.0 g of tin chloride ($SnCl_2$) in one liter of 0.010 to 0.10% HCl solution, and a palladium solution obtained by dissolving 0.10 to 1.0 g of palladium chloride ($PdCl_2$) in one liter of 0.010 to 0.10% HCl solution, are usable.

On the other hand, as a physical modification, a method of vapor-depositing a metal nobler than silver on the ITO electrode may be employed.

The optical filter of the present invention desirably uses a solution of the type which does not exert absorption power in the visible light region when color-fading is effected and uses ITO electrodes of the type which does not exert absorption power in the visible light region, since the color-developing and color-fading substrate electrodes are operated as an optical filter.

When color-developing and color-fading states are repeated by use of the RED solution, the devices are so miniscule that the solution system cannot be stirred. For overcoming this drawback, the color-developing and color-fading states should be driven under current control so that the electrochemical precipitation and dissolution of silver can easily be quantified.

As a method of driving color-developing and color-fading states under current control, the following two types of methods are preferable in accordance with the purpose of achievements. In one method, a current that is changed from a higher magnitude to a lower magnitude in a rectangular shape is applied in order to increase the color-developing and color-fading velocity (silver precipitating and dissolving velocity). In the other method, a current that is changed from a lower magnitude to a higher magnitude in a rectangular shape is applied with a view to reducing damage to the substrates due to the repeating precipitation and dissolution of silver.

The present inventors also used a solvent having a lower freezing point so as to prevent a deterioration in low-temperature characteristics and to endure low temperatures, in a non-aqueous reversible system that causes silver to be precipitated from a silver complex salt on transparent electrodes and be dissolved. The present inventors further made a study of a reducing agent applicable to such a solvent.

As a result, they found that at least one type of compounds selected from the group consisting of the previously-discussed DMAB, DEAB, TMAB, and alkali metal salts thereof is extremely effective as a reducing agent that is applicable to the above type of solvent having a lower freezing point (hereinafter referred to as the reducing agent of the present invention).

All the reducing agents of the present invention can be sufficiently used in a solvent having a low freezing point to improve low-temperature characteristics. They are more easily dissolved in this type of solvent than the above-discussed ascorbic acid. The reducing agent of the present invention is preferably added at a concentration in a range from $1/150$ time to one time of the silver salt.

An embodiment of the present invention will now be described.

Figure 15:
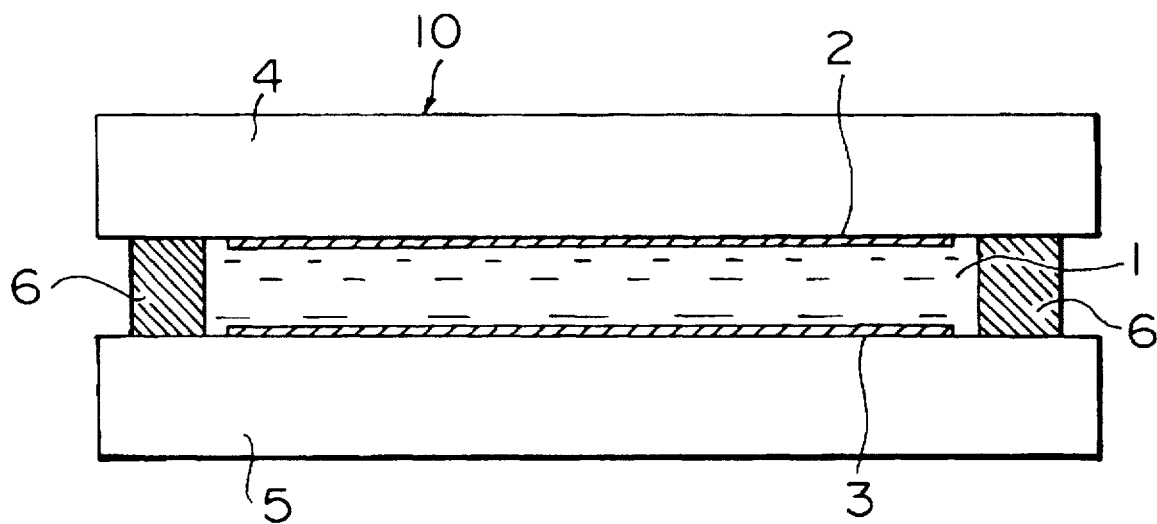
FIG. 15 is a schematic sectional view of an optical filter according to the present invention.
Figure 16:
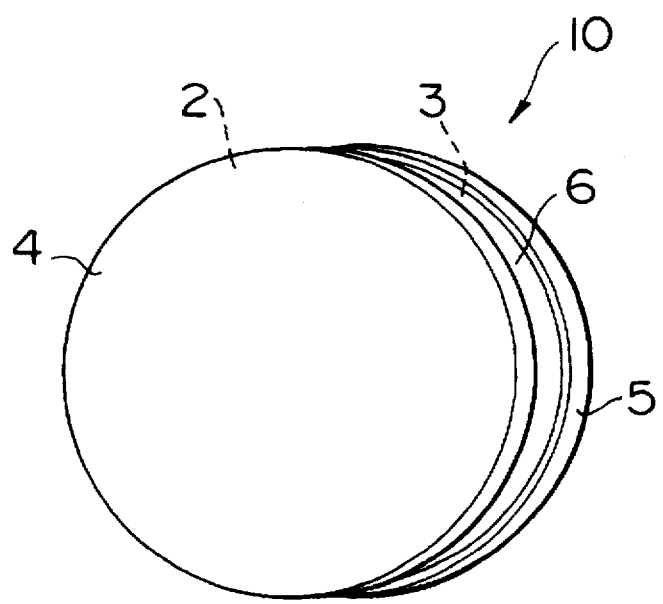
FIG. 16 is a schematic view illustrating the concept of the same optical filter.

FIGS. 15 and 16 schematically illustrate an optical filter generally denoted by 10 according to an embodiment of the present invention.

The optical filter 10 includes a pair of transparent substrates (for example, glass plates) 4 and 5 forming a cell, and working electrodes (for example, ITO electrodes) 2 and 3 located on the inner surfaces of the substrates 4 and 5. The transparent substrates 4 and 5 are disposed as display windows across a predetermined spacing. At least one of the working electrodes 2 and 3 serves as a color-developing electrode or a color-fading electrode.

A counter electrode 6 is provided, doubling as a spacer around the entire periphery of the substrates 4 and 5. A silver plate, for example, is used as the counter electrode 6. A silver wire, for example, is used as a reference electrode (not shown).

An RED solution 1 obtained by dissolving a silver (complex) salt in a non-aqueous solvent, used as an RED material according to the present invention, is sealed between the working electrodes 2 and 3, while the liquid 1 is in contact with the electrodes 2 and 3. The working electrodes 2 and 3 function as anodes, while the counter electrode 6 serves as a cathode. A DC driving voltage is applied between the working electrodes 2 and 3 and the counter electrode 6 for a predetermined time, thereby causing a silver (complex) salt to effect the following oxidation-reduction reaction on the cathode:

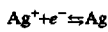

The resulting Ag precipitate transfers the color of the substrates serving as display windows from a transparent state to a colored state.

In this manner, Ag is precipitated on the electrodes, whereby a specific color (varying depending on the type of silver complex salt) developed by the Ag precipitate can be observed through the display windows, whereby Ag can serve as a filter material. This filtering function due to color developing, i.e., visible light transmittance (or color shades of gray) varies in accordance with the magnitude of voltage or the voltage applying duration. These factors are thus controlled, whereby this filter 10 can serve as a transmittance-variable filter.

Figure 17:
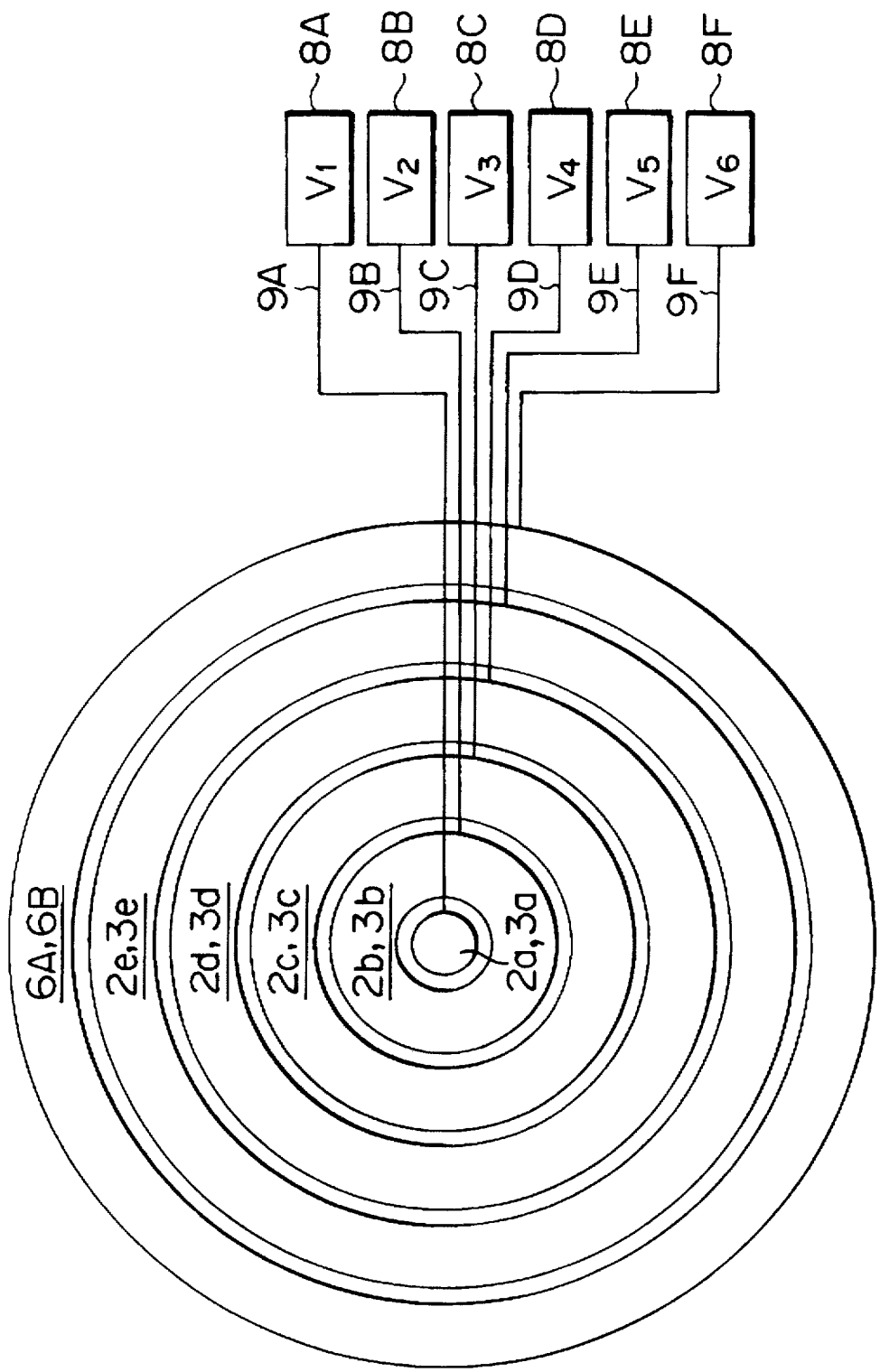
FIG. 17 illustrates an ITO electrode pattern used for the same optical filter.
Figure 18:
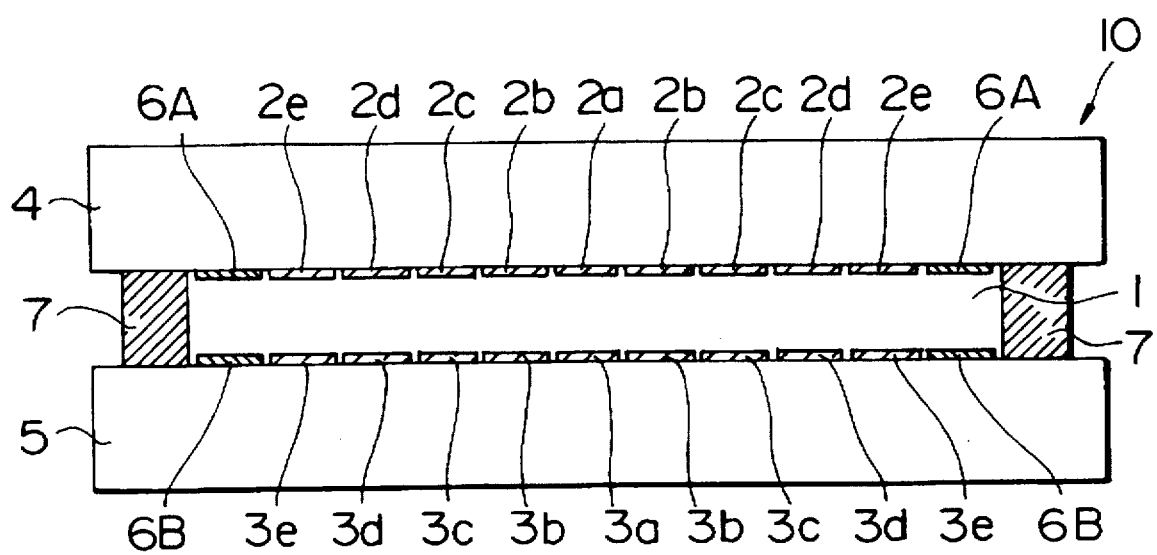
FIG. 18 is a schematic sectional view of the same optical filter.

Although this optical filter 10 may be constructed in such a manner that the working electrodes 2 and 3 are disposed on the entire surface of the cell, it may be constructed as shown in FIGS. 17 and 18 by way of example.

More specifically, the working ITO electrodes 2 and 3 provided for the transparent substrates 4 and 5, respectively, are divided into central electrode portions $2a$ and $3a$ and ring-like electrode portions $2b$ and $3b$, $2c$ $3c$, $2d$ and $3d$, and $2e$ and $3e$, respectively, the ring-like electrode portions being concentrically disposed across a very small spacing. Potential-compensating counter electrodes 6A and 6B are disposed around the outer-most peripheral electrode portions $2e$ and $3e$, respectively.

These electrode portions $2a$ and $3a$, $2b$ and $3b$, $2c$ and $3c$, $2d$ and $3d$, $2e$ and $3e$, and 6A and 6B are connected to drive powers 8A, 8B, 8C, 8D, 8E and 8F by wiring 9A, 9B, 9C, 9D, 9E and 9F, respectively, formed of chromium small-gage wires.

The transparent substrates 4 and 5 are disposed across a predetermined spacing by a spacer 7 (the counter electrode 6 doubles as a spacer in FIG. 15), and a RED solution 1 is sealed in a gap formed between the substrates 4 and 5.

The oxidation-reduction reaction (i.e., concentration) caused in the RED solution 1 is controlled in accordance with the magnitude of an applying voltage. In other words, voltages applied between the divided electrode portions $2a$ and $3a$, $2b$ and $3b$, $2c$ and $3c$, $2d$ and $3d$, and $2e$ and $3e$ (shall be indicated by $V_1$, $V_2$, $V_3$, $V_4$, and $V_5$, respectively) are controlled to vary the amount of silver precipitated from the RED solution on the respective cathodes of the respective divided electrode portions. It should be noted that a potential-compensating voltage $V_6$ is applied between the counter electrode portions 6A and 6B.

Hence, if all the applying voltages are equally applied to all the electrode portions ($V_1=V_2=V_3=V_4=V_5$), the RED solution 1 can be uniformly and entirely colored, and the degree of color density can also be uniformly changed according to the applying equal voltage.

If the applying voltages are differentiated, for example, as expressed by $V_1<V_2<V_3<V_4<V_5$, the color density becomes greater (in other words, the transmittance becomes smaller) from the central electrode portions to the peripheral electrode portions. This type of filter is effectively applicable to an optical aperture for use in a CCD (Charge Coupled Device) of a television camera or the like, since it can sufficiently cope with improved integrity of a CCD. If voltages are applied to the respective electrode portions in a manner reverse to the magnitudes described above, the transmittance becomes greater from the central electrode portions to the peripheral electrode portions.

In the manner discussed above, the color shades of gray and gradations can be controlled with various patterns by varying voltages applied to the divided electrode portions, whereby this optical filter becomes extremely useful and can be applied to a wider range of use.

As is seen from the foregoing description, according to this embodiment, based on a new idea totally different from the conventional EC materials, a RED material containing a silver salt is used as a filter material for optical equipment in order to adjust the amount of light, and the driving operation of the working electrodes (in particular, applying voltages) are controlled, whereby the color shades of gray can be changed during the color development of the RED material. Taking advantage of this feature, gradations can be produced in the resulting optical filter. By use of this RED material, it is thus possible to provide a filter serving as a small-sized and low-powered device for adjusting the amount of light, which produces better performance than conventional variable ND filters that have been mechanically operated.

Also, a RED solution obtained by dissolving a silver salt as a RED material in a non-aqueous solvent (for example, DMF) of the present invention is used. The non-aqueous solvent has a sufficiently low freezing point, whereby the resulting RED solution exhibits excellent low-temperature characteristics. The type of a non-aqueous solvent is determined depending on the type of reducing agent (for example, ascorbic acid) to be added to the RED materials, and the non-aqueous solution dissolves the silver salt together with the reducing material therein.

This embodiment will now be explained in detail with reference to specific examples. In the following examples, the optical filter constructed as shown in FIGS. 15 and 16 is used.

EXAMPLE 1

(Precipitation and Dissolution of Silver Halide (AgX: X Indicates Halogen))

Silver halide was used to make a study of a system of the precipitation and dissolution of reversible silver. The present inventors focused on silver iodide (AgI) among silver complex salts and considered the precipitation and dissolution of this silver iodide.

In this example, for the detection of the precipitated potential of silver, examinations were made of a change in the transmittance obtained by varying the constant potential.

Dimethylformamide (DMF) was employed as a solvent. The concentration of silver iodide was set to be 0.5 mol/liter. Sodium iodide (NaI) was dissolved in the solvent so that the concentration would be 0.5 mol/liter in order to dissolve the silver iodide in the solvent and also to increase electrical conductivity. Further, ascorbic acid (AsA) was dissolved as a reducing agent to result in the concentration of 0.1 mol/liter so as to prepare a RED solution, which was then poured in a filter.

A change in the transmittance was tracked under the following potential conditions. As discussed above, ITO electrodes were used as working electrodes, a silver wire was used as a reference electrode, and a silver plate was employed as a counter electrode.

An explanation will now be given of the functions of the respective electrodes. The ITO electrodes serve to adjust the amount of light to a desired value of transmittance. The counter electrode is used to send and receive electrons in a direction completely opposite to the ITO electrodes during the light adjustment. The reference electrode serves the function of obtaining the potential that will be constantly used as the reference, and is thus disposed away from the RED solution since it should not be influenced by the reaction.

Figure 2:
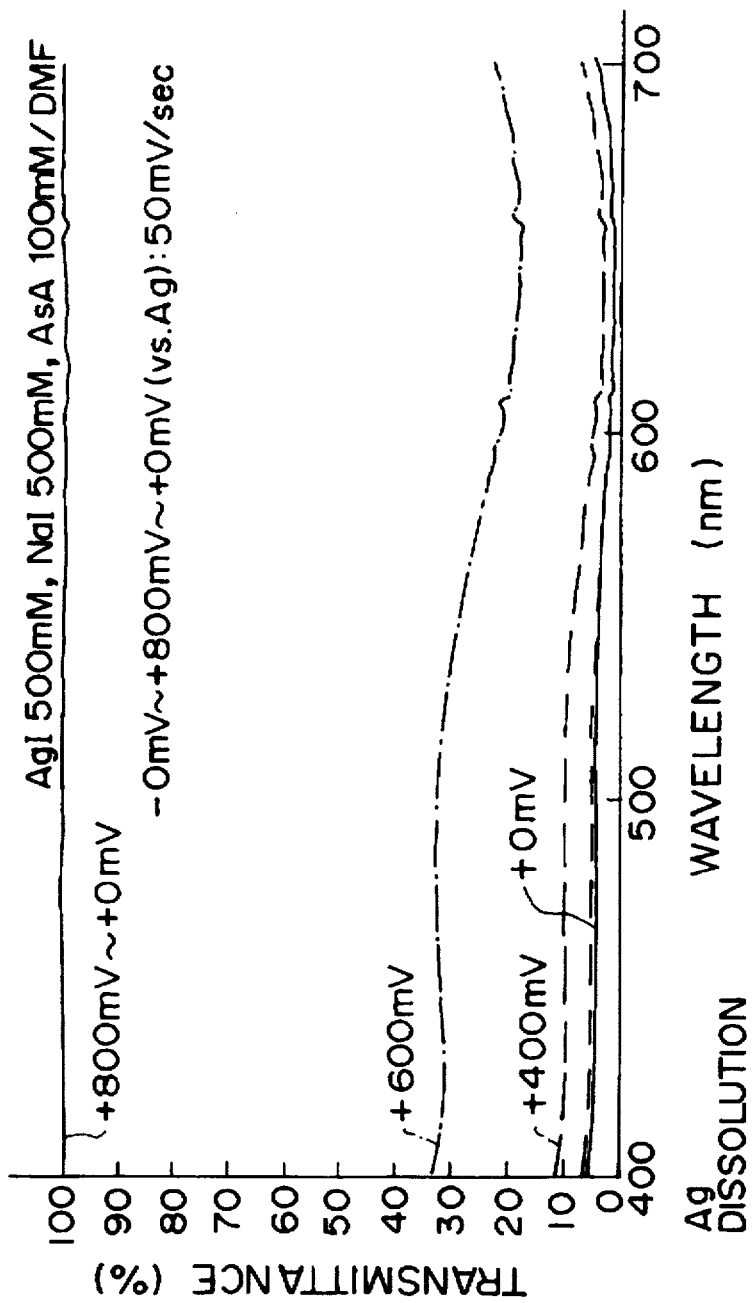
FIG. 2 illustrates spectral characteristics indicating a change in transmittance caused by applying voltages when color-fading of the same optical filter is effected.

A change in transmittance on the surface of the transparent electrodes was measured at ordinary temperatures according to the cyclic voltammetry (CV). The results are expressed by graphs shown in FIGS. 1 and 2. FIG. 1 shows a reduction in transmittance caused by precipitation of silver. FIG. 2 illustrates a recovery of transmittance due to dissolution of silver. The measurement were carried out under the conditions of a sweeping range of the CV method from −800 mV to +800 mV relative to the potential of silver and a sweeping velocity of 50 mV/sec.

More specifically, FIG. 1 shows that the amount of silver precipitated on the working electrodes was increased and, accordingly, the transmittance was reduced as the potential was varied in the order of −800 mV, −600 mV, −400 mV, −200mV and −0 mV after the potential had been changed from 0 mV to −800 mV. In FIG. 1, the process of the above-mentioned potential change is indicated by 0 mV —600 mV, −800 mV, −600 mV(r), −400 mV(r), −200 mV(r) and −0 mV(r). On the other hand, FIG. 2 shows a change in the transmittance during the process of varying the potential applied to the working electrodes, in the order of +0 mV, +400 mV, +600 mV and +800 mV.

Figure 19:
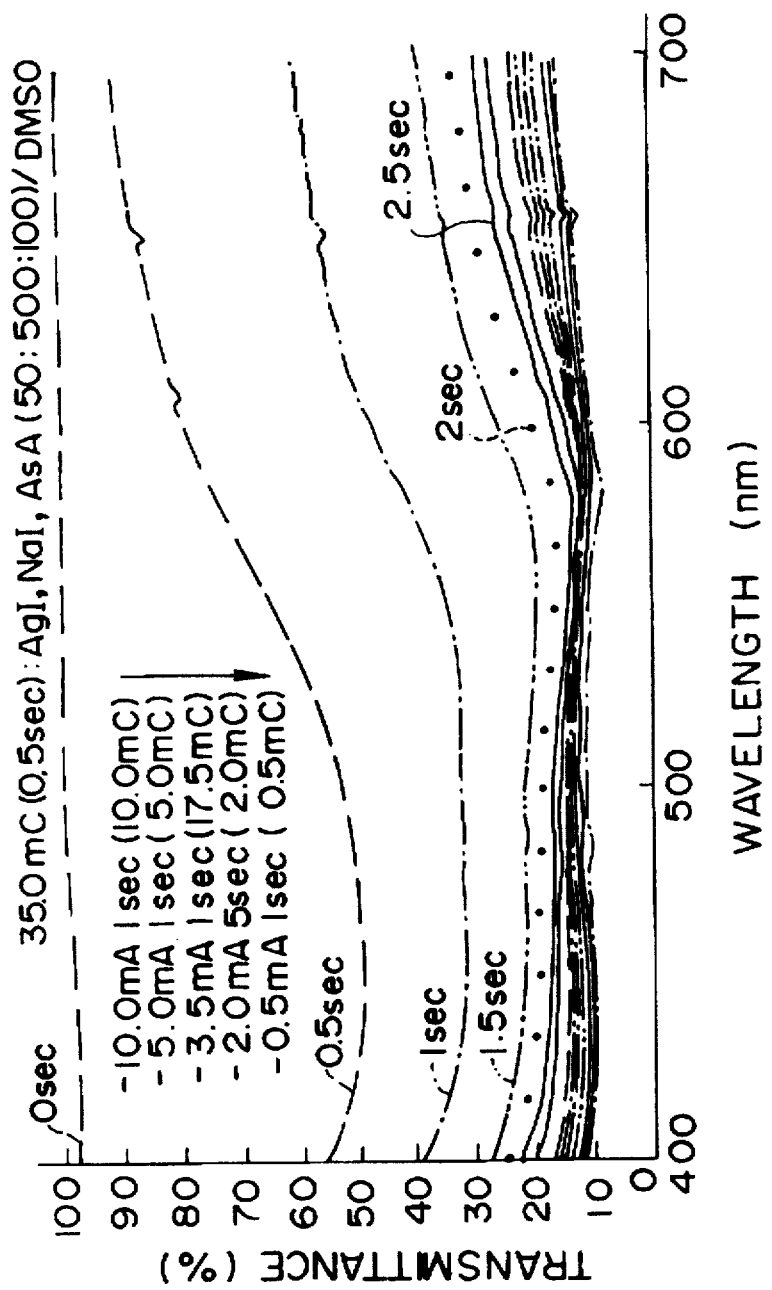
FIG. 19 illustrates spectral characteristics indicating a change in transmittance of an optical filter used in Comparative Example by the application of a driving current.
Figure 20:
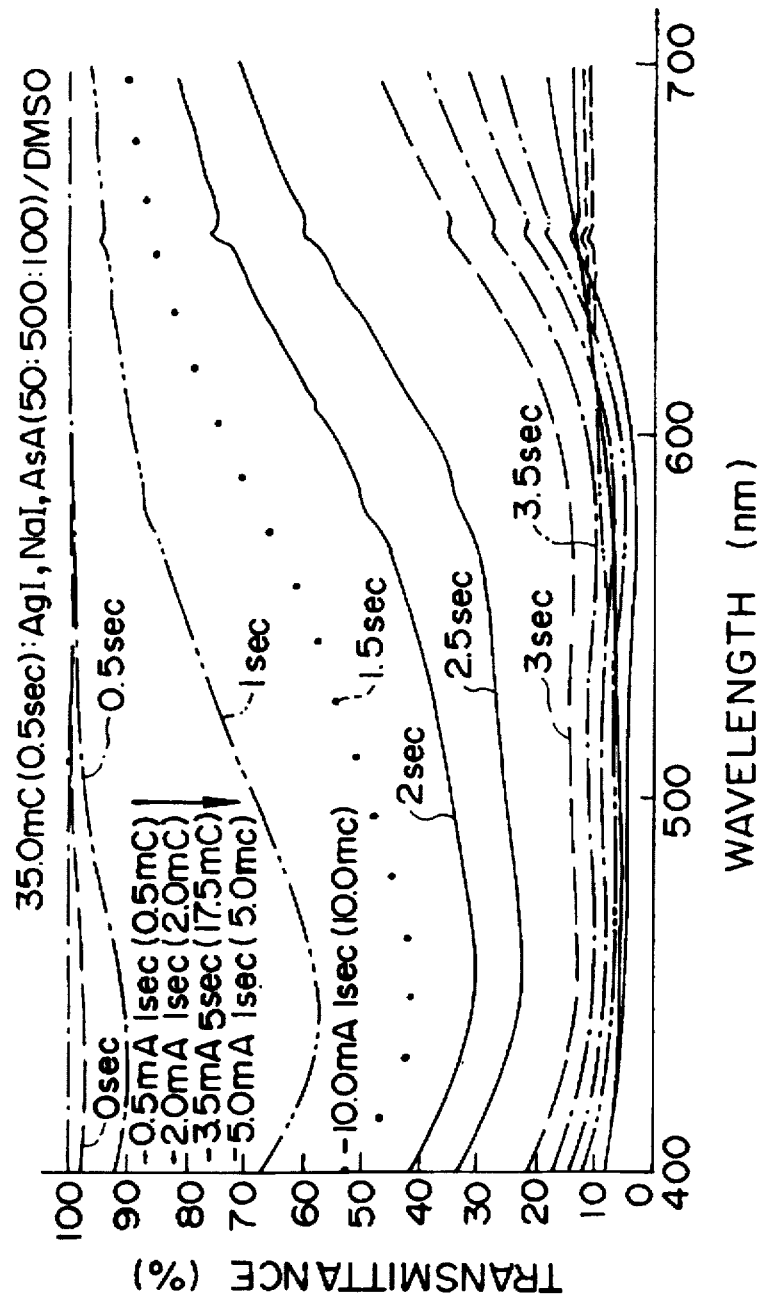
FIG. 20 illustrates spectral characteristics indicating a change in transmittance of the same optical filter according to another driving method.

FIGS. 1 and 2 indicate that the RED solution of the present invention is used to reversibly change the transmittance in accordance with the applying voltage. It has thus been confirmed that the resulting filter is extremely useful as an optical filter. FIGS. 19 and 20 show transmittance changes obtained by carrying out the CV measurements at ordinary temperatures in a manner similar to the previous measurements, except that dimethyl sulfoxide (DMSO) was used as a solvent instead of the DMF used in the previous measurements. It should be noted that FIG. 19 shows the transmittance change obtained when a current is varied from a higher magnitude to a lower magnitude, while FIG. 20 illustrates the transmittance change when a current is varied from a lower magnitude to a higher magnitude. This experiment indicates that the RED solution containing DMF as a solvent according to the present invention achieves a transmittance change substantially similar to that obtained by the RED solution containing DMSO.

Figure 21:
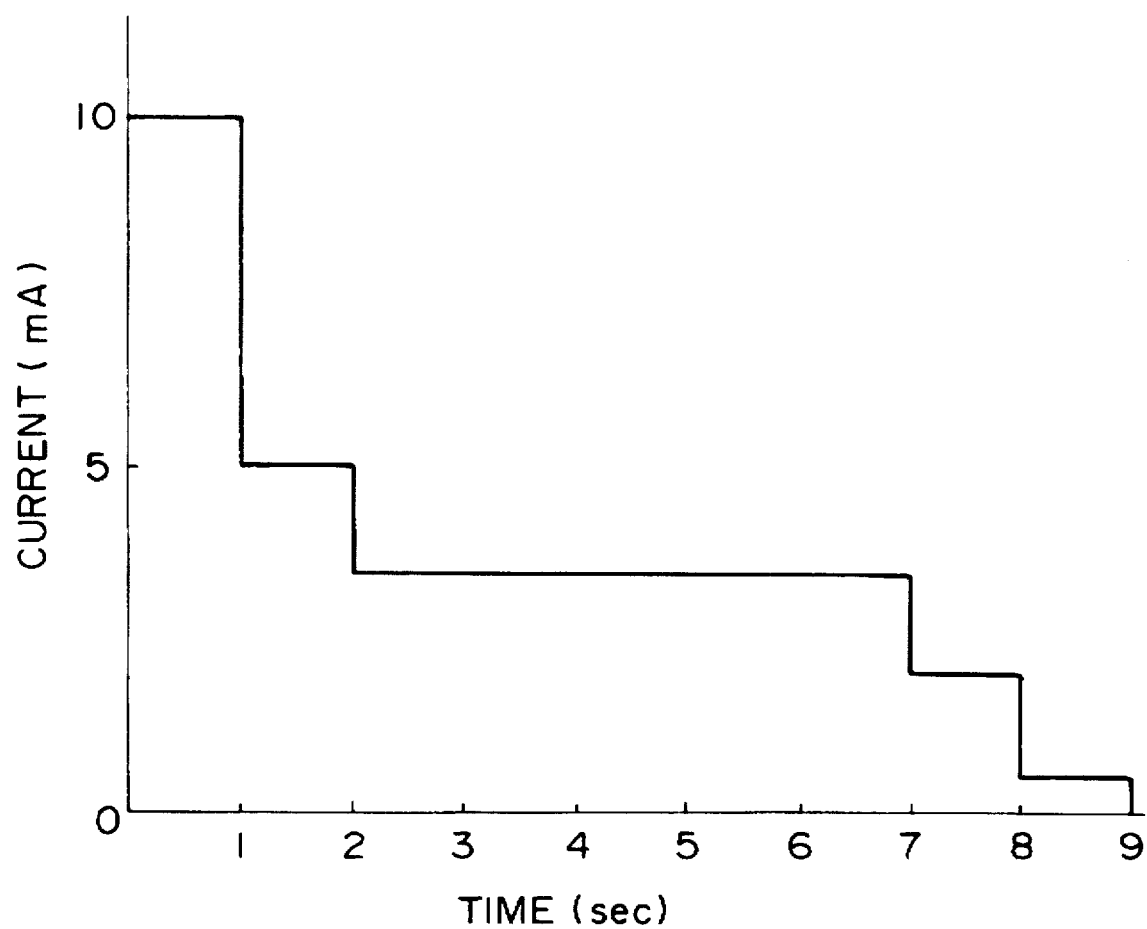
FIG. 21 is a chart indicating a change in applying current with respect to time.

FIG. 19 shows a change in transmittance with respect to a lapse of time, in accordance with the integral of the driving current as indicated in FIG. 21.

As is seen from FIGS. 19 and 20, by use of the RED solution of the present invention, the driving method of applying a current in the order from a lower magnitude to a higher magnitude shown in FIG. 20 may cause the working electrodes to eventually exhibit good shielding power, though the shielding velocity is slightly delayed (it takes approximately from 4.5 to 5.0 seconds to achieve 20% of transmittance) than the use of the driving method of applying a current in the order from a higher magnitude to a lower magnitude shown in FIG. 19. With respect to the shielding velocity and the shielding degree, although no substantial difference of the maximum reduction in the transmittance after a lapse of 9 seconds can be observed between the use of the former driving method and the latter driving method, a substantial difference of a reduction in the transmittance at the initial stage can be observed.

EXAMPLE 2

Figure 22:
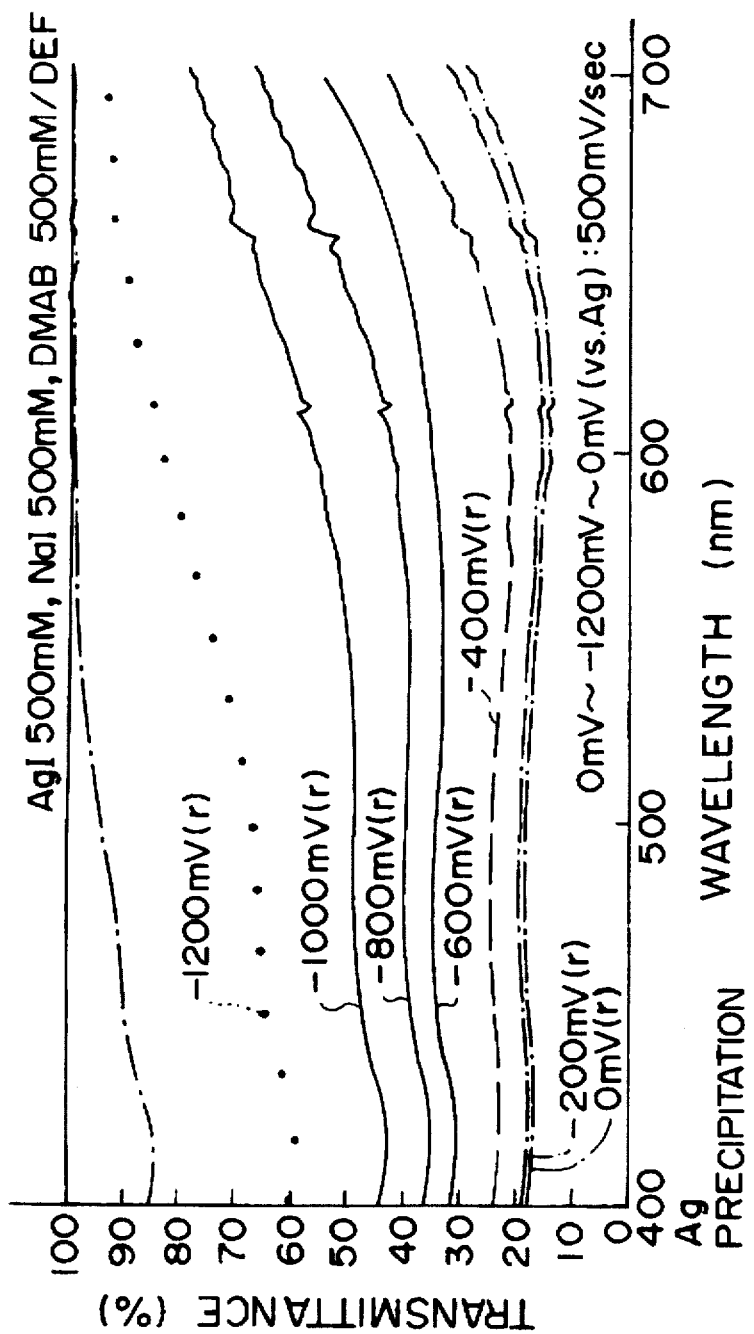
FIG. 22 illustrates spectral characteristics indicating a change in transmittance caused by applying voltages when color-developing of a further optical filter according to the present invention is effected.
Figure 23:
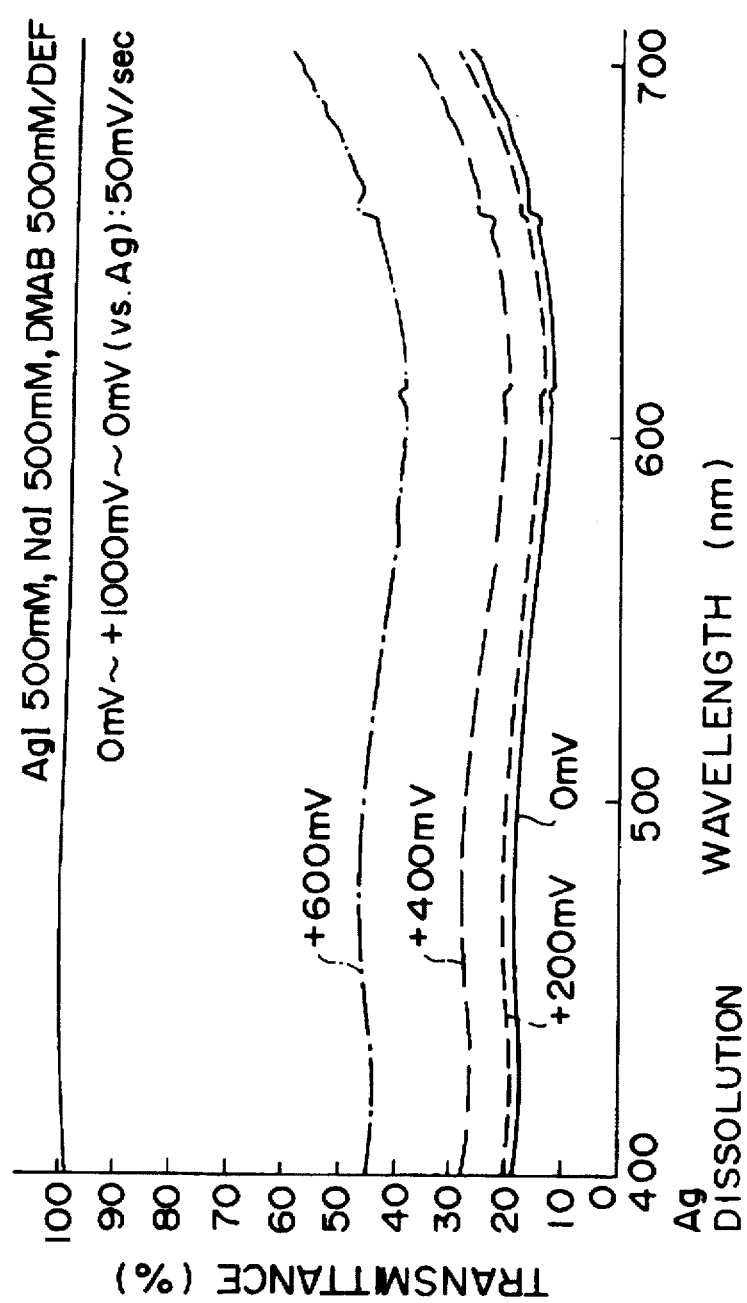
FIG. 23 illustrates spectral characteristics indicating a change in transmittance caused by applying voltages when color-fading of the same optical filter is effected.

FIGS. 22 and 23 show a change in spectral characteristics obtained by use of an RED solution (electrolyte) prepared by adding 500 mM/L of dimethylamineborane (DMAB) as a reducing agent instead of ascorbic acid employed in Example 1. FIG. 1 illustrates spectral characteristics indicating a reduction in transmittance during the precipitation of silver, while FIG. 2 shows spectral characteristics indicating a recovery of transmittance during the dissolution of silver.

The transmittance was measured according to a potential sweeping (cyclic voltammetry) method, and the sweeping range was from −1200 mV to +1000 mV relative to the potential of silver. Measurements were started at the same potential as the silver at a sweeping velocity of 50 mV/sec in the order from precipitation to dissolution of silver. Data on spectral characteristics was collected at every 200 mV.

Figure 6:
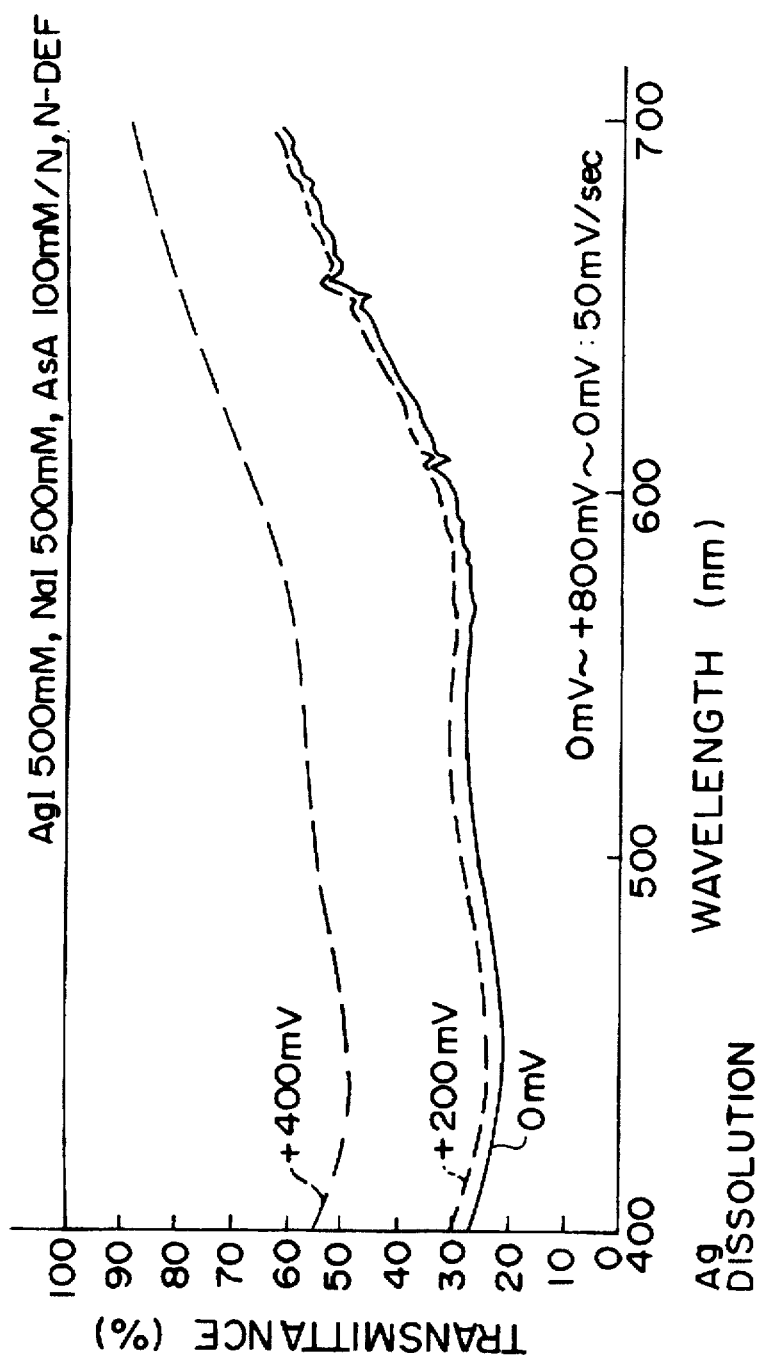
FIG. 6 illustrates spectral characteristics indicating a change in transmittance caused by applying voltages when color-fading of the same optical filter is effected.
Figure 7:
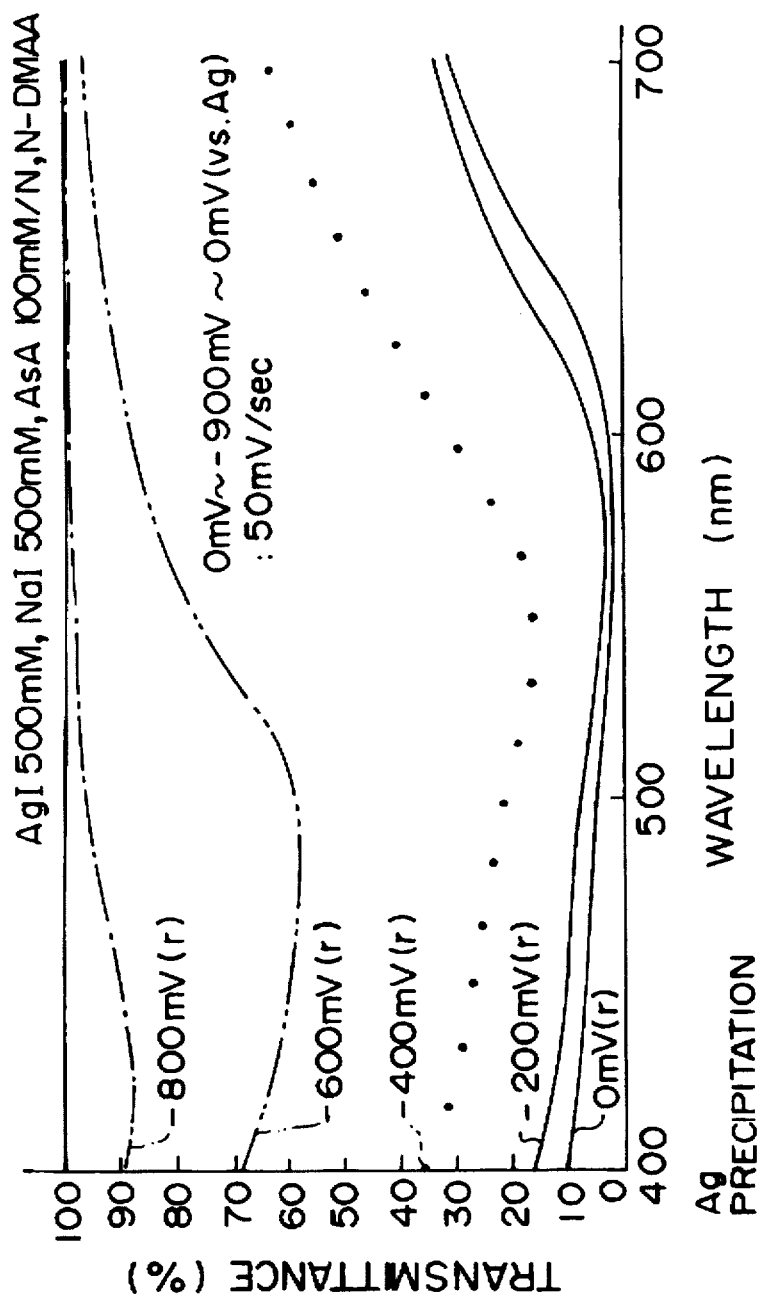
FIG. 7 illustrates spectral characteristics indicating a change in transmittance caused by applying voltages when color-developing of a further optical filter according to the present invention is effected.
Figure 8:
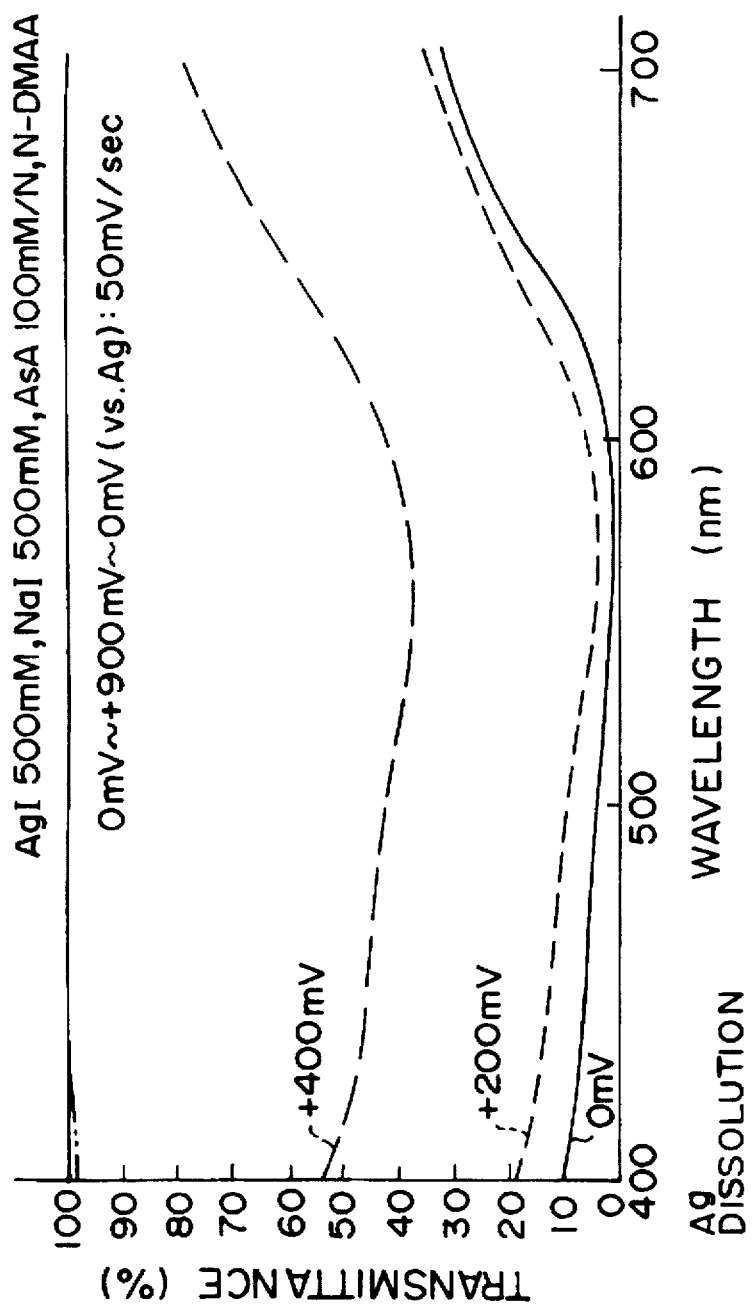
FIG. 8 illustrates spectral characteristics indicating a change in transmittance caused by applying voltages when color-fading of the same optical filter is effected.
Figure 9:
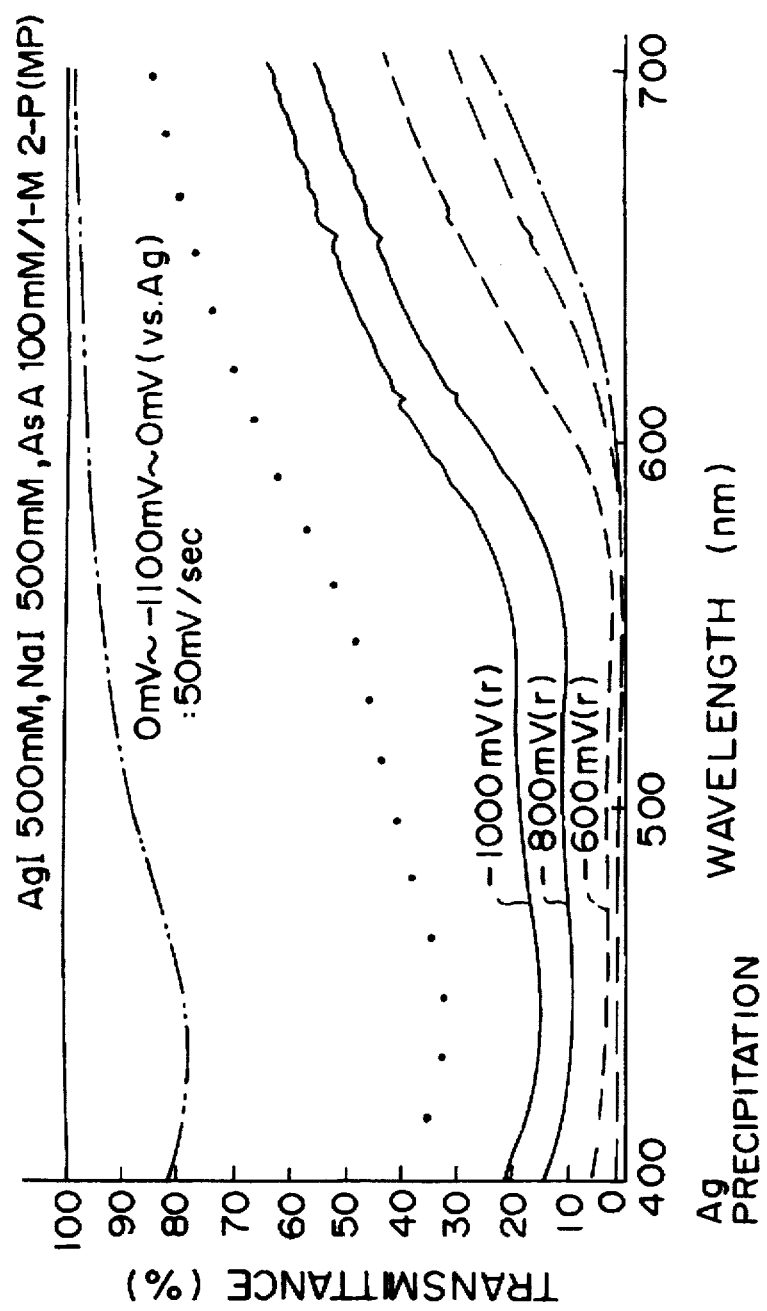
FIG. 9 illustrates spectral characteristics indicating a change in transmittance caused by applying voltages when color-developing of a further optical filter according to the present invention is effected.
Figure 10:
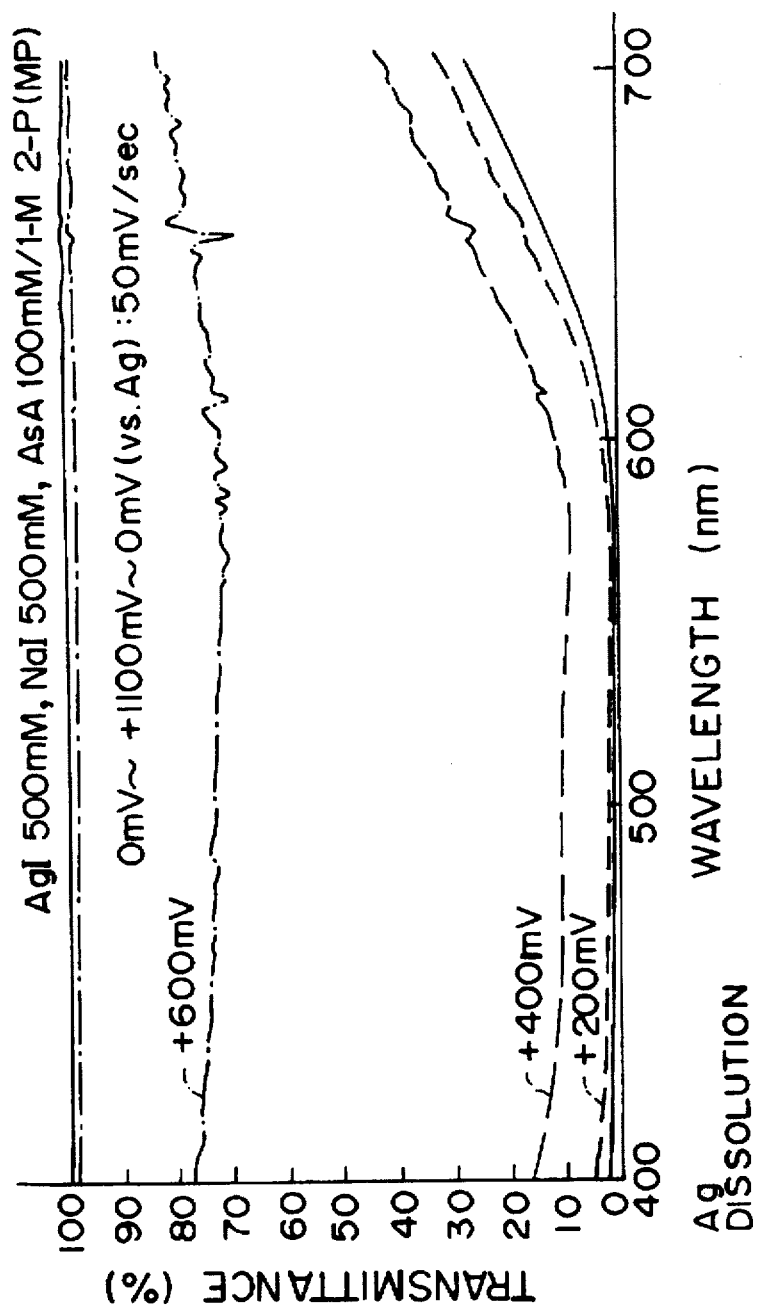
FIG. 10 illustrates spectral characteristics indicating a change in transmittance caused by applying voltages when color-fading of the same optical filter is effected.

FIGS. 22 and 23 show that DMAB was used as a reducing agent according to the present invention so as to obtain a system having reversible properties of precipitation and dissolution equivalent to or better than those accomplished by a system using ascorbic acid as a reducing agent illustrated in FIGS. 6 and 7.

COMPARATIVE EXAMPLE 1

(Use of DMSO)

CV measurements were made at ordinary temperature under the conditions similar to those of Example 1, except that 100 mM/L of DMSO, instead of DMF, was used as a solvent. The results are shown in FIGS. 24 and 25.

Figure 5:
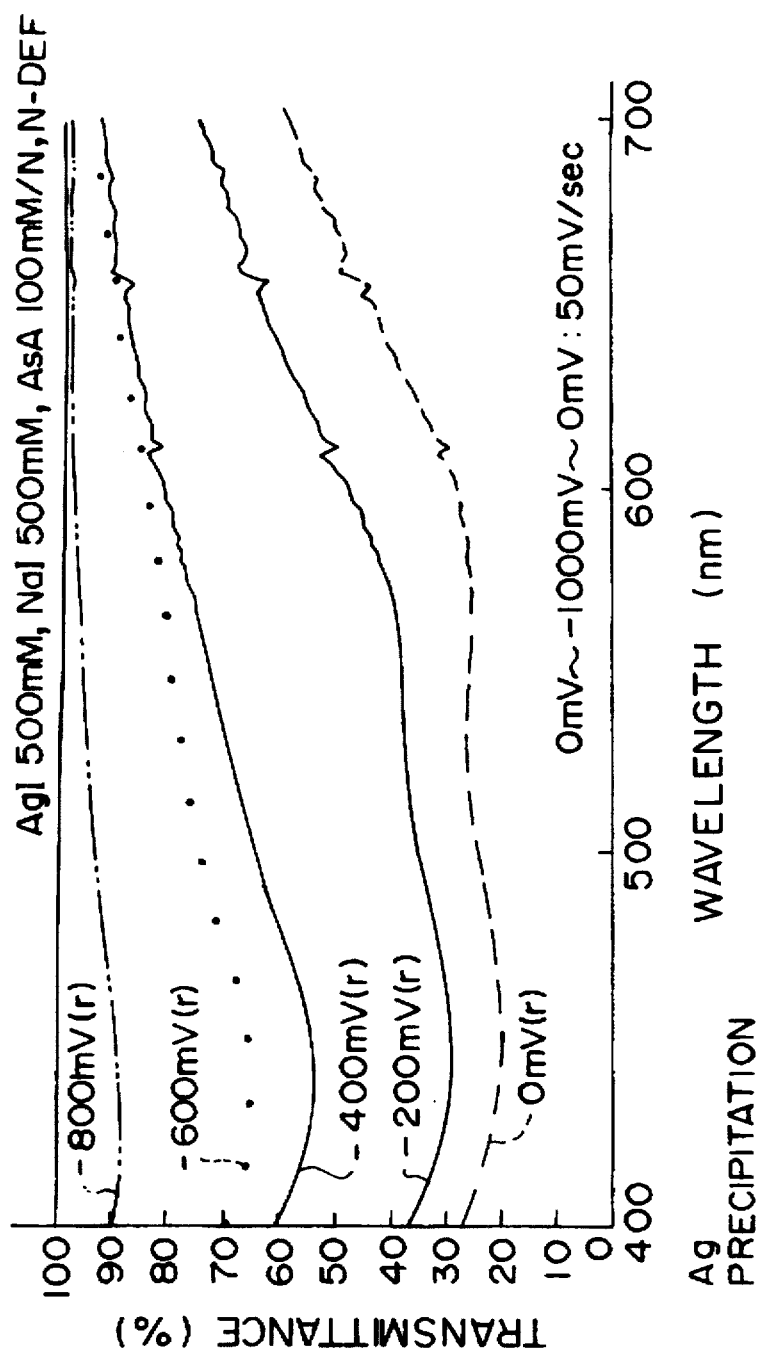
FIG. 5 illustrates spectral characteristics indicating a change in transmittance caused by applying voltages when color-developing of still another optical filter according to the present invention is effected.
Figure 24:
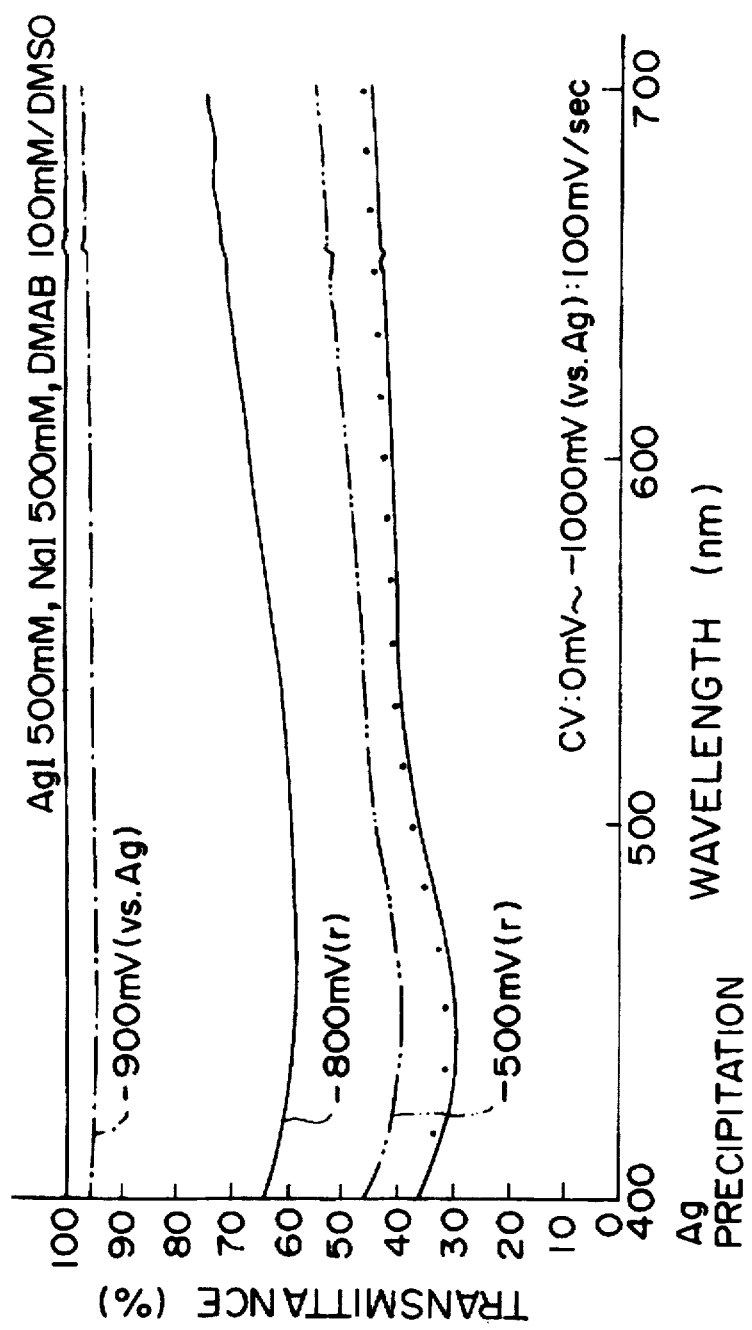
FIG. 24 illustrates spectral characteristics indicating a change in transmittance caused by applying voltages when color-developing of a further optical filter according to the present invention is effected.
Figure 25:
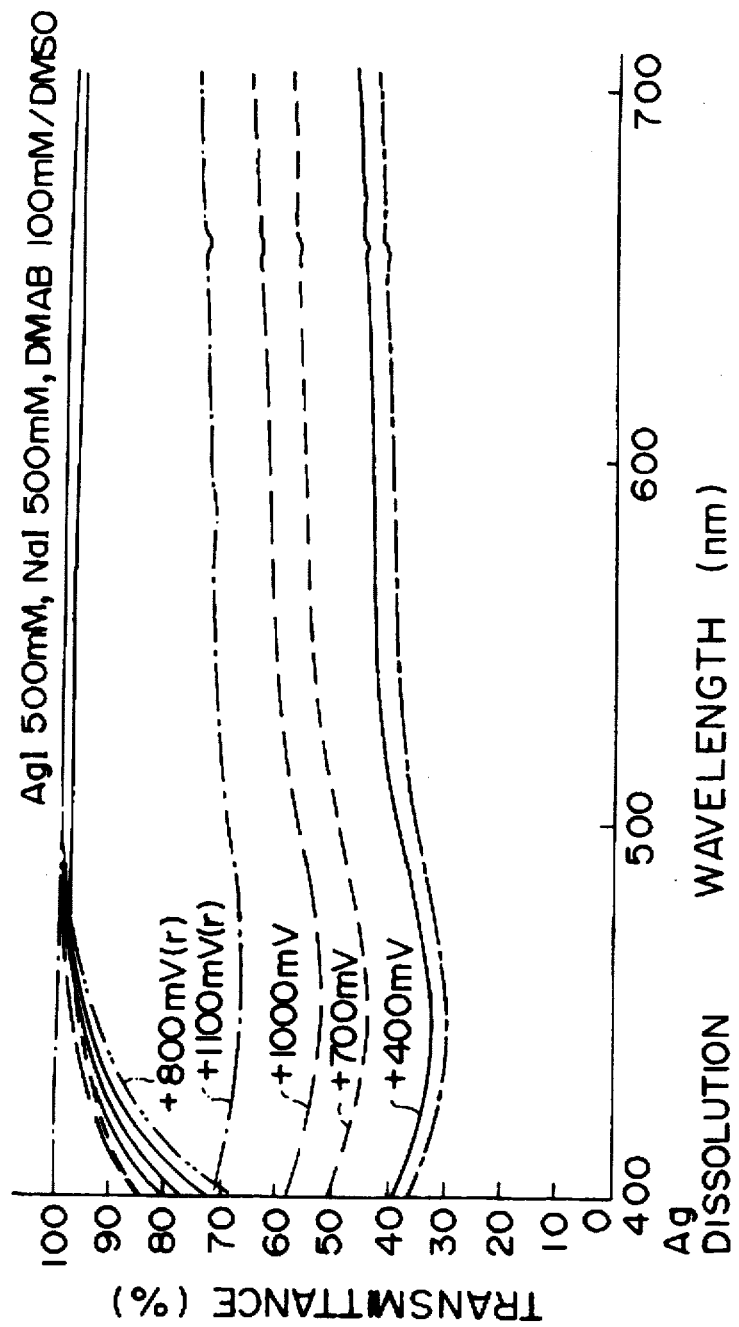
FIG. 25 illustrates spectral characteristics indicating a change in transmittance caused by applying voltages when color-fading of the same optical filter is effected.

FIGS. 24 and 25 indicate that the transmittance with respect to a wavelength in a range of from 400 to 500 nm during the dissolution of silver is improved compared to the transmittance shown in FIG. 5 (no reducing agent added) This validates that $I_2$ was reduced with DMAB. Thus, by the use of DMSO, as well as DMF, as a solvent, the advantage of adding a reducing agent can be exhibited.

EXAMPLE 3

(Determination of Low-Temperature Shelf Stability)

Figure 3:
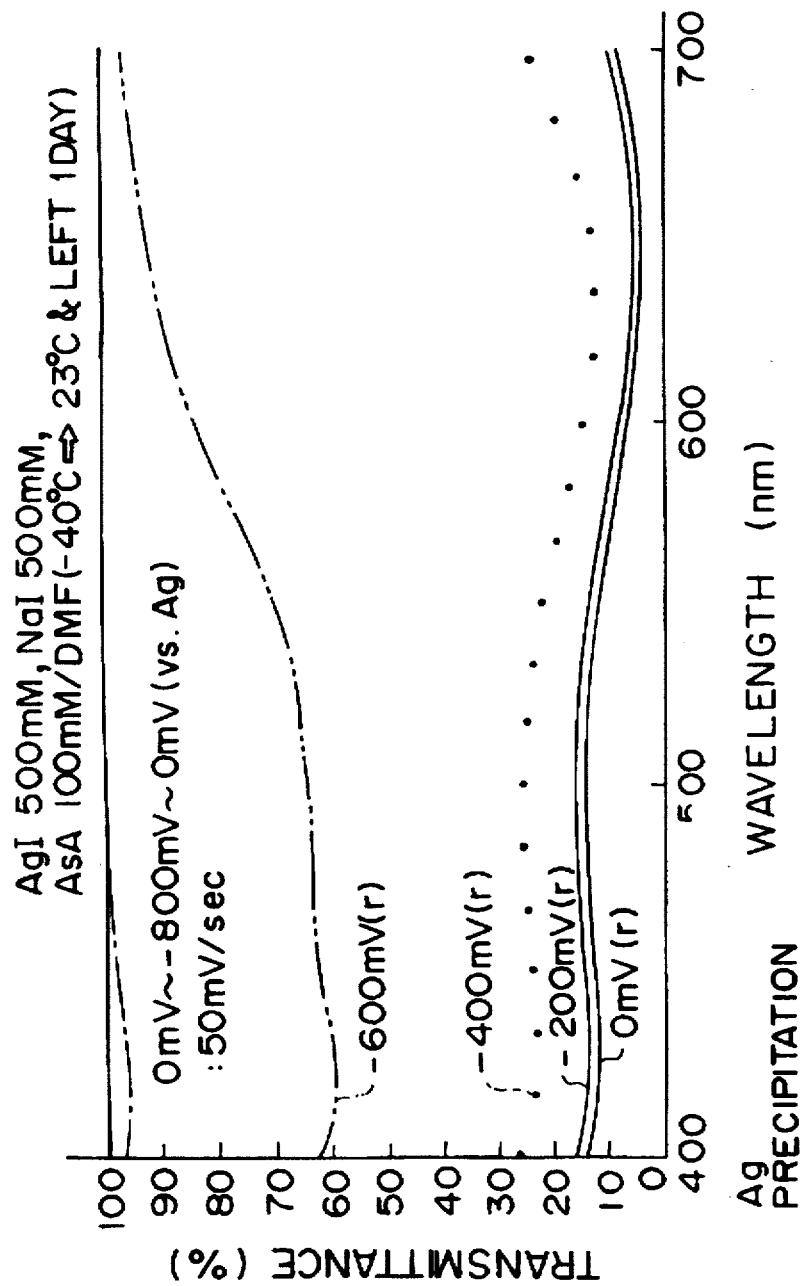
FIG. 3 illustrates spectral characteristics indicating a change in transmittance caused by applying voltages when color-developing of another optical filter according to the present invention is effected.
Figure 4:
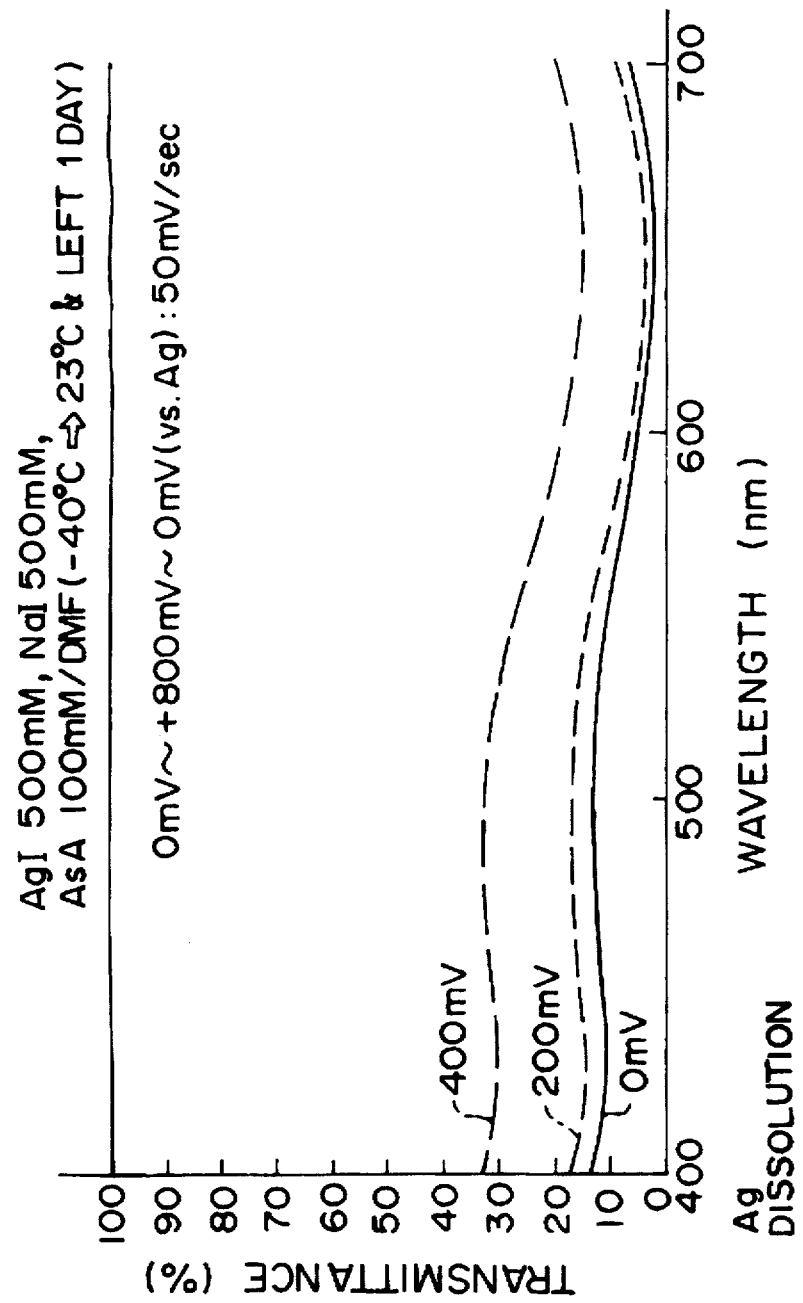
FIG. 4 illustrates spectral characteristics indicating a change in transmittance caused by applying voltages when color-fading of the same optical filter is effected.

Low-temperature shelf stability was tested. The results are shown in FIGS. 3 and 4. Measurements were made after the filter had been left at −40° C. for 24 hours and further left at room temperature for one day. The above-described CV measurements were made in a sweeping range at a sweeping velocity similar to those employed in the previous examples.

FIGS. 3 and 4 show that a sufficient change in the transmittance can be exhibited even at a temperature as low as −40° C. The RED solution (electrolyte) employed in this example was not frozen even after it had been left at −40° C. for one day.

EXAMPLE 4

(use of other type of non-aqueous solvents)

By use of the following non-aqueous solvents, instead of DMF, RED solutions were prepared, whereby filters were produced in a manner similar to Example 1. The CV measurements were performed. The results are shown in FIGS. 5 –14.

Example 4: N, N-diethylformamide (DEF)—FIGS. 5 and 6

Example 5: N, N-dimethylacetamide (DMAA)—FIGS. 7 and 8

Example 6: N-methylpyrrolidone (MP)—FIGS. 9 and 10

Figure 11:
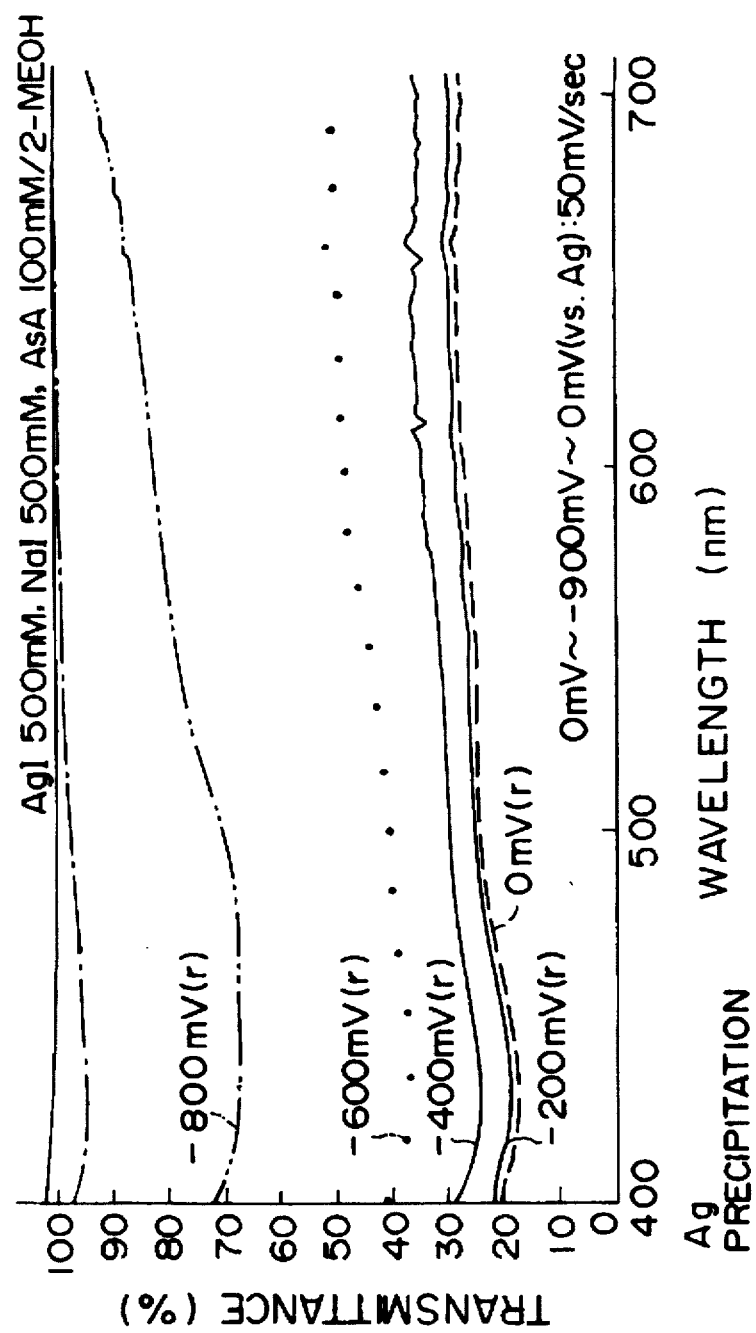
FIG. 11 illustrates spectral characteristics indicating a change in transmittance caused by applying voltages when color-developing of a further optical filter according to the present invention is effected.
Figure 12:
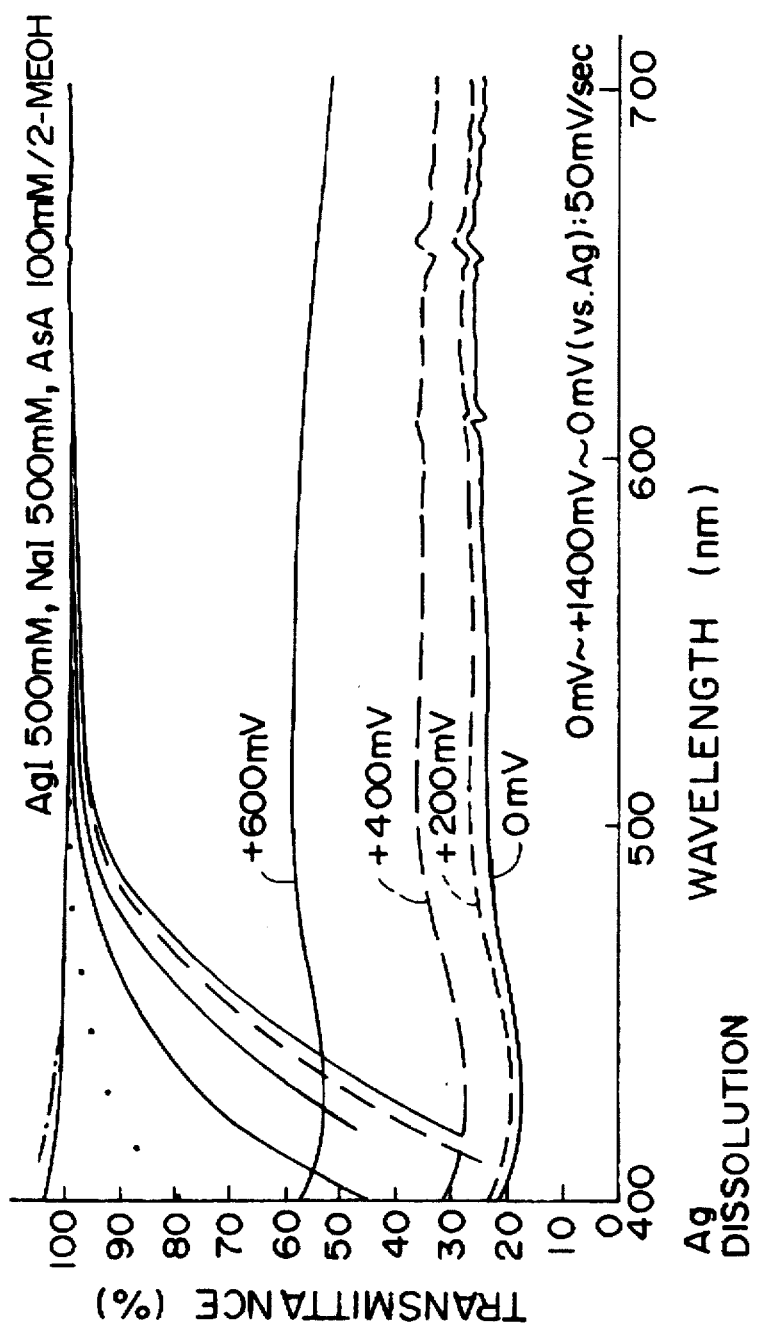
FIG. 12 illustrates spectral characteristics indicating a change in transmittance caused by applying voltages when color-fading of the same optical filter is effected.

Example 7: 2-methoxyethanol (MEOH)—FIGS. 11 and 12

Figure 13:
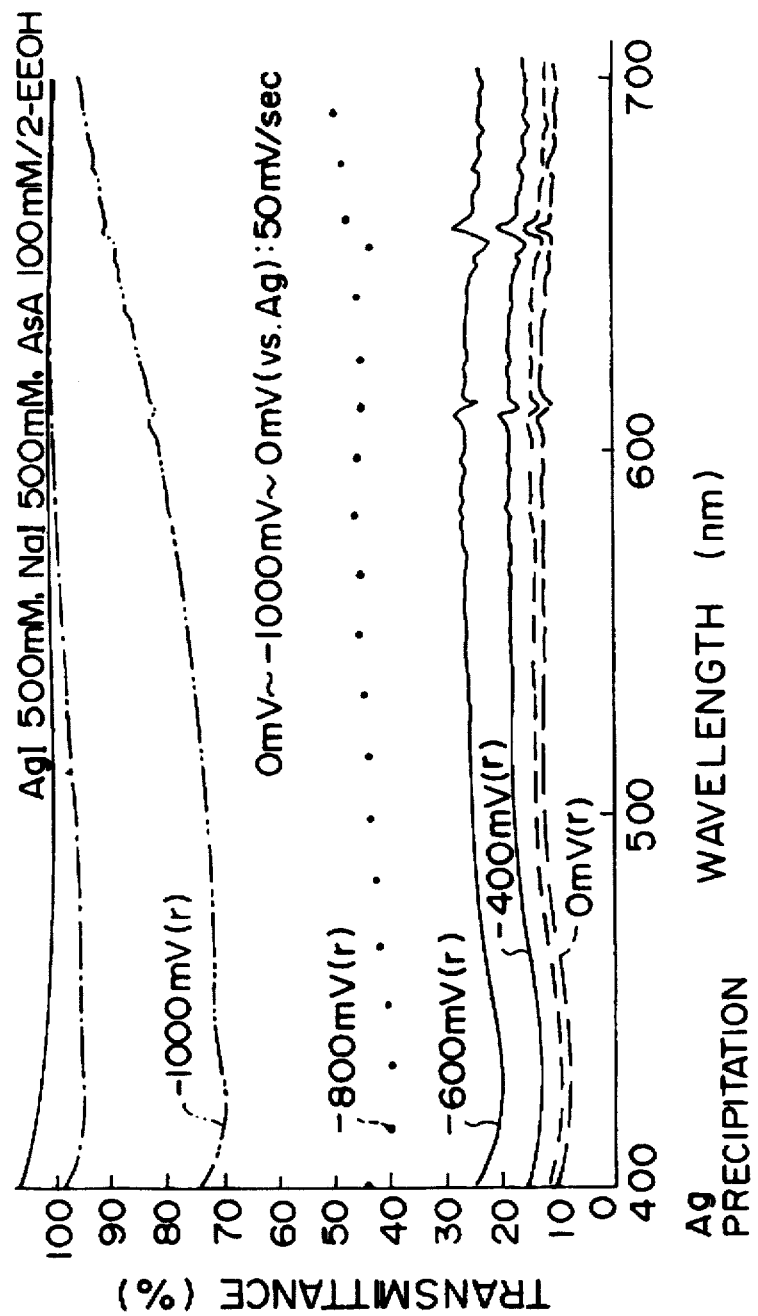
FIG. 13 illustrates spectral characteristics indicating a change in transmittance caused by applying voltages when color-developing of a further optical filter according to the present invention is effected.
Figure 14:
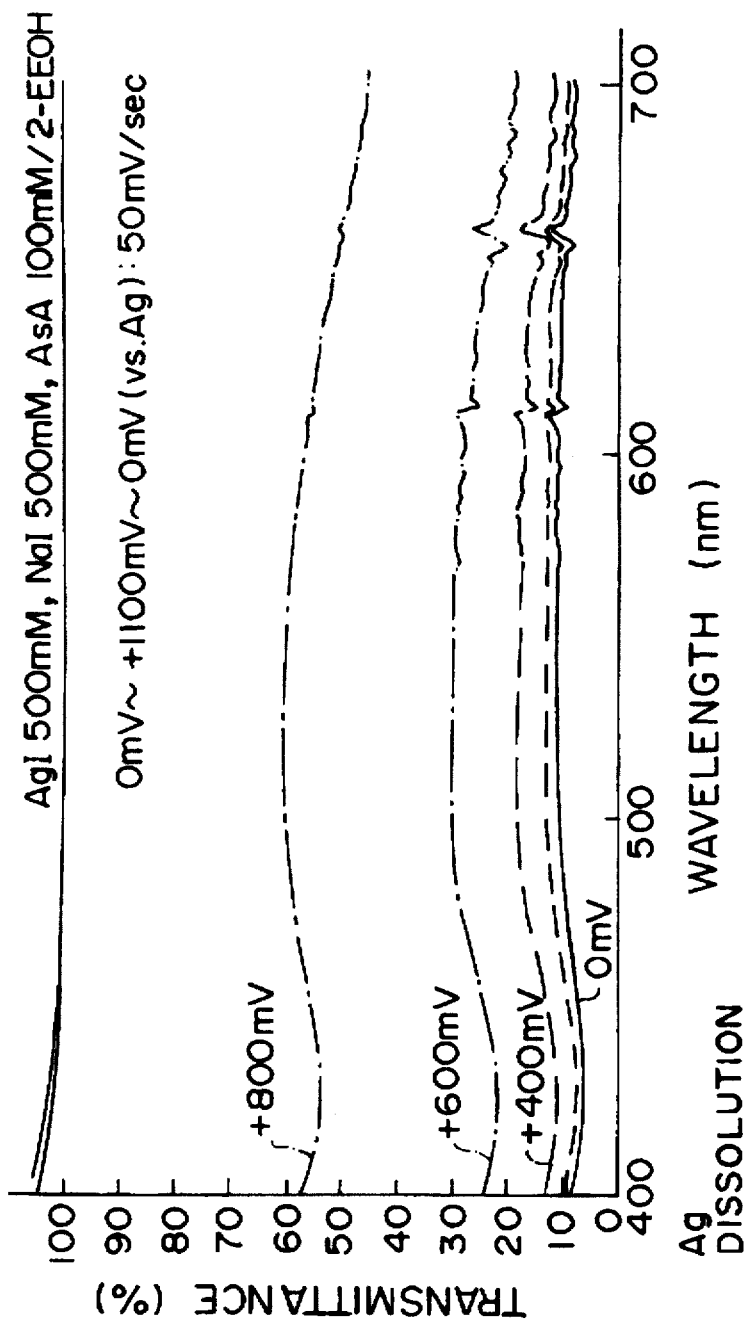
FIG. 14 illustrates spectral characteristics indicating a change in transmittance caused by applying voltages when color-fading of the same optical filter is effected.

Example 8: 2-ethoxyethanol (EEOH)—FIGS. 13 and 14

FIGS. 5–14 indicate that changes in the transmittance in accordance with the potentials can be obtained by use of the other types of non-aqueous solvents as well as DMF. It has thus been confirmed that each filter was useful as an optical filter.

EXAMPLE 9

(Low-Temperature Shelf Stability Test on Non-aqueous Solvents)

The freezing points of the non-aqueous solvents of the present invention are shown in Table 1 (the freezing point of DMSO is also shown for comparison).

TABLE 1

| Freezing Point of Solvents (pure solvent) | |
|---|---|
| Solvent | Freezing point (°C.) |
| DMF | −60.4 |
| DEF | −78.0 |
| DMAA | −20.0 |
| MPA | −30.9 |
| N-MP | −24.4 |
| MEOH | −85.1 |
| EEOH | −60.4 |
| DMSO | 18.0 |

The low-temperature shelf stability test was carried out on the solvents in a manner similar to that in Example 3. The results are shown in Table 2.

TABLE 2

| Solvent Low-temperature Shelf Stability Test (left at −40° C. for 24 hours) AgI: 500 mM NaI: 500 mM AsA: 100 mM | |
|---|---|
| Solvent | State |
| DMF | Liquid |
| DEF | Liquid |
| DMAA | Partially solidified |
| MPA | Liquid |
| N-MP | Partially solidified |
| MEOH | Liquid |
| EEOH | Liquid |
| DMSO | Solidified |

As is seen from table 2, the non-aqueous solvents of the present invention were not completely solidified but were substantially maintained in a liquid state even after they had been left at −40° C., and were thus still usable. By use of dimethylamineborane (DMAB) as a reducing agent, instead of ascorbic acid (ASA), similar results were realized. In contrast, DMSO was completely solidified (frozen) and was not usable.

EXAMPLE 10

(Durability Test)

A preliminary test was performed for checking durability of the filters with respect to color-developing and color-fading (precipitation and dissolution of silver) characteristics by employing the two types of driving methods discussed in Example 1. As a result, it has been confirmed that approximately 800 cycles or more can be repeated according to the higher to lower current driving method and approximately 1000 cycles or more can be repeated according to the lower to higher current driving method.

This further confirms that the higher to lower current driving method is more effective than the other driving method with a view to increasing the driving velocity, and vice versa for decreasing damage to electrodes.

EXAMPLE 11

(Effect of Inhibiting the Generation of Iodine by a Reducing Agent)

Conventionally, during the above-described reaction, when silver is dissolved after being precipitated, iodine ($I_2$) is disadvantageously produced according to a reaction expressed by the following formula, which makes a solution system cloudy in a brownish color.

$$2I^- \rightarrow I_2 - 2e^- \qquad (1)$$

reference oxidation-reduction potential lower than that of iodine is mixed into a solution, whereby the precipitation of iodine ($I_2$) can be inhibited.

More specifically, ascorbic acid was contained as a reducing agent in the RED solution employed in Example 1. Since a system having ascorbic acid dissolved therein is colorless, it does not make the solution cloudy. Accordingly, the use of ascorbic acid is advantageous since the resulting optical filter exhibits higher transmittance. Ascorbic acid also acts as a reducing agent so as to ionize iodine and to inhibit the precipitation of iodine while silver is dissolved, thus preventing the solution from becoming cloudy. From this fact, ascorbic acid can be suitably used as a reducing agent.

Further, tin chloride may be substituted for ascorbic acid, or both compounds may be used together. Alternatively, at least one type of reducing agent selected from the group consisting of dimethylamineborane, diethylamineborane, trimethylamineborane, and alkali metal salts thereof may be used. In those cases, the effect of preventing the precipitation of iodine similar to that obtained by ascorbic acid may be realized. It should be noted that care should be taken to the selection of a reducing agent in order not to make a solution system cloudy (in other words, not to cause a reduction in the transmittance) for the application to an optical filter, as well as not to cause precipitation of iodine.

EXAMPLE 12

(Palladium Nucleus Surface Treatment)

Two types of solutions, such as a palladium solution and a tin solution were prepared for conducting palladium nucleus surface treatment. The solutions were prepared under the following conditions.

a) palladium solution 0.1 g of palladium chloride ($PdCl_2$) was dissolved in one liter of 0.1% HCl solution so as to prepare a palladium solution. $PdCl_2$ was initially dispersed, but dissolved after being stirred for 6 hours, whereby the solution became cloudy in a yellowish color.

b) tin solution 0.1 g of $SnCl_2$ was dissolved in 0.1% HCl 100 mL so as to prepare a tin solution.

Electroless plating was performed on ITO electrodes by use of these solutions according to the following procedure.

(1) The ITO electrodes were soaked in the tin solution which was then stirred for one minute, and a tin nucleus was precipitated on the ITO electrodes (substrates).

(2) The substrates were washed with pure water for 30 seconds for removing a surplus of tin solution.

(3) The electrodes were soaked in the palladium solution which was then stirred for one minute so that the tin nucleus precipitated in step (1) was substituted by a palladium nucleus.

(4) A surplus of palladium solution was removed by washing the substrates with pure water for 30 seconds.

The above-mentioned series of steps was determined to be one cycle.

EXAMPLE 13

(Change in Transmittance of ITO Electrodes that Underwent Palladium Treatment)

Measurements were made to the transmittance of the ITO electrodes that had underwent the palladium treatment for various numbers of cycles in order to determine the degree of a decrease in the transmittance of the ITO electrodes produced in Example 12.

More specifically, the transmittance in a wavelength in a range from 350 to 820 nm was measured. Three ITO substrates were used as specimens, such as a non-palladium treated ITO substrate, a substrate that underwent the palladium treatment for 4 cycles [hereinafter referred to as a Pd(4) substrate], and a substrate that was subjected to the palladium treatment for 10 cycles [hereinafter referred to as a Pd(10) substrate].

Approximately 10% of a reduction in the transmittance of the Pd(10) substrate compared to the non-treated ITO film was detected in a wavelength range of from approximately 350 to 650 nm, while approximately 5% of a decrease in the transmittance of the Pd(10) substrate was detected in a wavelength range from approximately 680 to 820 nm. In contrast, no substantial difference of transmittance was observed between the pd(4) substrate and the non-treated ITO substrate. This tendency was also detectable when platinum was vapor-deposited on the ITO substrate according to a vacuum deposition process instead of a palladium treatment.

EXAMPLE 14

(Measurements of a Change in Transmittance by use of ITO Electrodes that Underwent a Palladium Treatment)

An RED solution employed in this example was prepared by dissolving 100 mmol of AgI, 500 mmol of NaI and 100 mmol of AsA in DMF used as a solvent. An ITO electrode, a Pd(6) substrate and a Pd(10) substrate were used as working electrodes. A silver wire was used as a reference electrode, and a silver plate was used as a counter electrode.

A rectangular-shaped voltage (vs. Ag wire) at −800 mV was applied to the solution for 500 msecond, and a rectangular-shaped voltage at 0 mV was also applied for 1 second.

The above voltages were applied for 25 times, whereby the transmittance of the Ag film precipitated on the working electrodes was measured.

As a consequence, approximately 2% of transmittance, i.e., shielding degree, of the non-treated ITO substrate was detectable in a wavelength of approximately 460 nm. On the other hand, 45 to 65% of transmittance (shielding degree) of the palladium-treated Pd(6) substrate and 68 to 84% of transmittance of the palladium-treated Pd(10) substrate were achieved according to the electrodeposition method with a comparatively low applying voltage at −800 mV. The working electrodes having the highest transmittance (maximum shielding degree) presented a pale black color. Also, by use of the RED solution employed in Example 2, advantages of the palladium treatment similar to those obtained in this example were realized.

As is seen from the foregoing description, the state of the precipitated silver (Ag) was significantly changed due to a palladium nucleus deposited on the ITO substrate, which makes it possible to considerably approximate the potential for precipitating Ag to the potential of the reference electrode. This reduces damage to working electrodes caused by the application of overvoltage and also decreases the power consumption required for driving the solution as an RED material.

An explanation will now be given of an example in which silver chloride or silver bromide is used as silver halide.

Silver chloride or silver bromide can be used to reduce the color-developing side reaction gases generated during the precipitation of silver to a greater degree compared to silver iodide. This may arise from the fact that chlorine and bromine have higher reference oxidation and reduction potentials than iodine. It is thus possible to realize a system in which the precipitated silver film has uniform absorption in the visible light region. The reactions effected by use of those atoms are shown below:

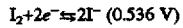

Silver chloride (complex salt) or silver bromide (complex salt) is used so that the resulting RED solution does not exert absorption power in the visible light region (wavelength from 400 to 700 nm) and sufficiently shields light substantially uniformly in the visible light region when color-developing is effected. This type of silver chloride (complex salt) or silver bromide (complex salt) is rich in reversible properties of precipitation and dissolution under driving control.

In the manner described above, in the present invention, by use of a reversible system which is capable of precipitating and dissolving silver on electrodes from silver chloride (complex salt) or silver bromide (complex salt), a low-powered and non-luminous optical apparatus, for example, an optical filter, suitable for the visible light region can be provided.

The optical apparatus of the present invention is constructed in such a manner that a solution prepared by dissolving silver chloride or silver bromide in water or a non-aqueous solvent, in particular, a non-aqueous solution, is poured so as to effect color-developing and color-fading caused by the precipitation and dissolution of silver, respectively.

An RED solution containing silver chloride or silver bromide at a concentration from 0.03 to 2.0 mol/liter is preferably used as the solution.

Additionally, at least one type of additive selected from a group consisting of a brightening agent, a complex salt-forming agent, and a reducing agent, is preferably added to the solution.

For example, at least one type of brightening agent selected from a group consisting of thiourea, allyl thiourea, mercaptobenzimidazole, and coumarin.

Also, at least one type of complex salt-forming agent selected from a group consisting of phthalic acid, succinic acid, salicylic acid and glycolic acid.

Further, at least one type of reducing agent selected from a group consisting of ascorbic acid, dimethylamineborane (DMAB), trimethylamineborane (TMAB), tartaric acid, oxalic acid, and gluconic lactone.

The reducing agent is preferably added at a concentration in a range from 1/150 times to one time of silver chloride or silver bromide.

At least one type of solvent (non-aqueous solvent) having a lower freezing point is preferably selected from a group consisting of dimethylformamide (DMF), diethylformamide (DEF), N, N-dimethylacetamide (DMAA), N-methyipropionamide (MPA), N-methylpyrrolidone (MP), propylene carbonate (PC), acetonitrile (AN), 2-methoxyethanol (MEOH), 2-ethoxyethanol (EEOH), and γ-butyrolactone (GBL).

For increasing electrical conductivity of the RED solution, a supporting salt is preferably added to the RED solution at a concentration in a range from one half to five times of silver iodide.

Moreover, for increasing electrical conductivity of the RED solution and also for enhancing dissolution of silver chloride, a supporting salt (supporting electrolyte) that can provide chlorine to the solution is preferably added so as to transform the silver chloride into the state of silver complex salt. Such supporting salts include, for example, sodium chloride, potassium chloride, calcium chloride and quaternary ammonium salt chloride.

The supporting salt is preferably added to the solution at a concentration in a range from one half to five times of silver chloride or silver bromide.

For increasing electrical conductivity of the RED solution and for enhancing dissolution of silver bromide, a supporting salt (supporting electrolyte) that can provide bromine and other types of halogen is desirably added so as to transform silver bromide into the state of silver complex salt. The supporting salts include, for example, sodium bromide, potassium bromide, calcium bromide and quaternary ammonium salt bromide.

The supporting salt is desirably added to the solution at a concentration in a range from one half to five times of silver chloride or silver bromide.

EXAMPLE 15

(Precipitation and Dissolution of Silver Chloride (AgCl) According to the Present Invention)

Silver chloride was used to consider a system having reversible properties of precipitation and dissolution of silver. In this example, a change in transmittance during precipitation and dissolution of silver was determined.

Dimethylformamide (DMF) was employed as a solvent. The concentration of silver chloride was 0.05 mol/liter. For dissolving silver chloride and for enhancing electrical conductivity, quaternary ammonium salt (tetra-n-butyl ammonium chloride in this example) was dissolved in the solvent so that the concentration would become 0.2 mol/liter. Additionally, thiourea [$SC(NH_2)_2$] as a brightening agent was dissolved so that the concentration would become 1.0 g/liter so as to prepare an RED solution, which was then poured in the filter.

A change in transmittance was traced under the following potential conditions. ITO electrodes were used as working electrodes. A silver electrode was employed as a reference electrode, and a silver plate was used as a counter electrode.

Figure 26:
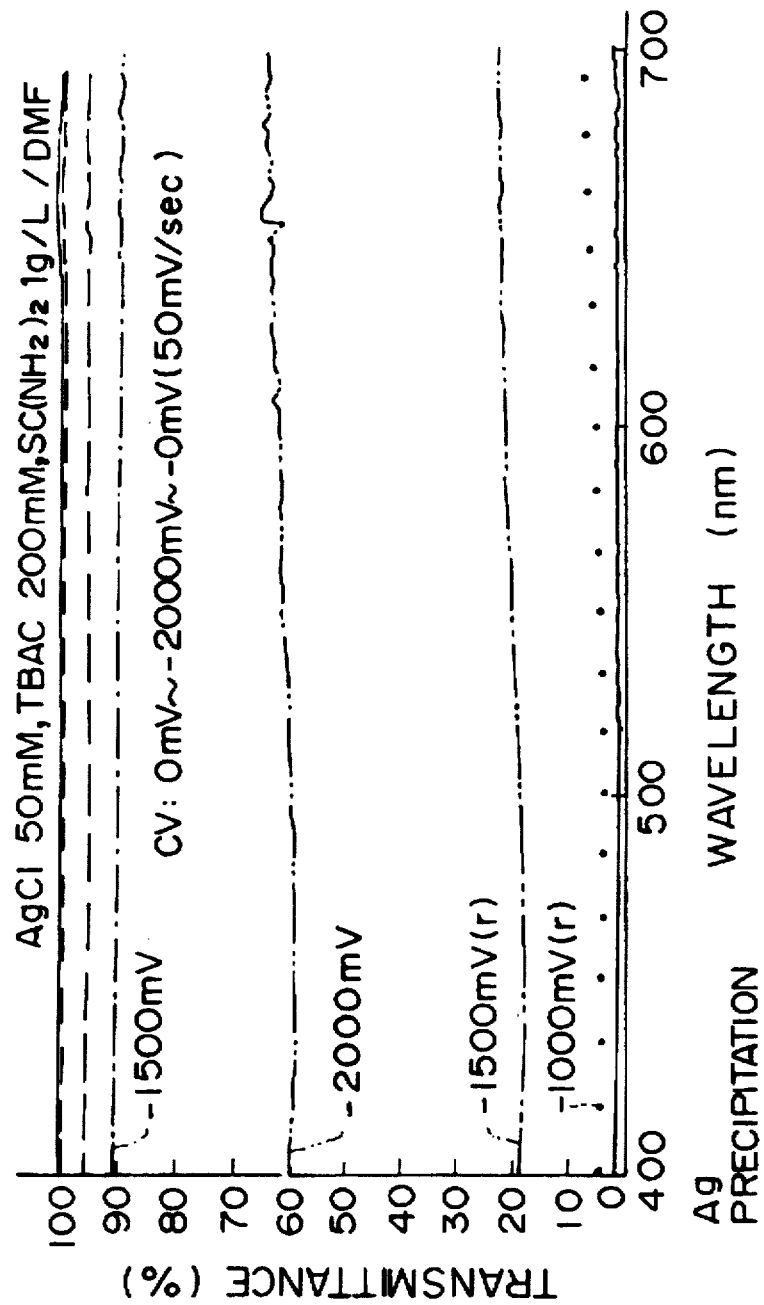
FIG. 26 illustrates spectral characteristics indicating a change in transmittance caused by applying voltages when color-developing of a further optical filter according to the present invention is effected.
Figure 27:
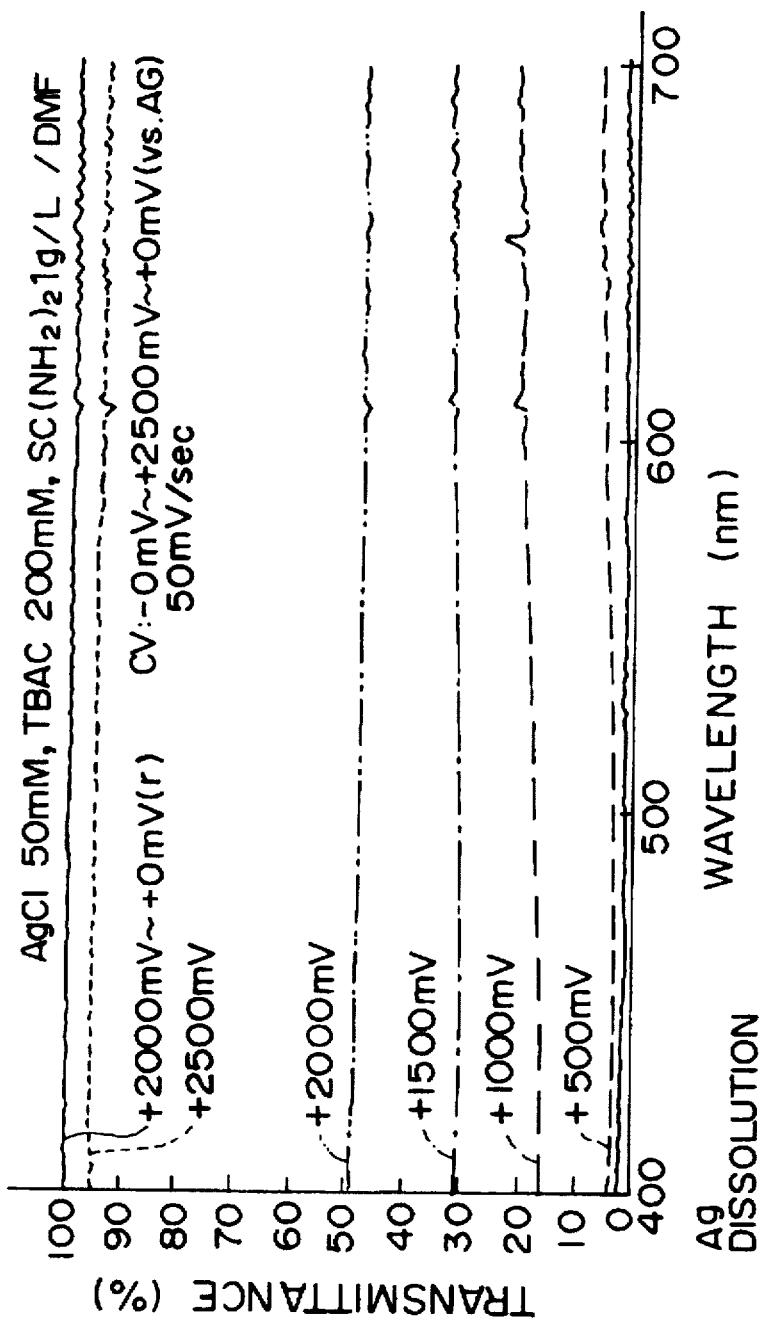
FIG. 27 illustrates spectral characteristics indicating a change in transmittance caused by applying voltages when color-fading of the same optical filter is effected.

FIGS. 26 and 27 show changes in spectral characteristics measured by use of the above-described RED solution (electrolyte). FIG. 26 illustrates spectral characteristics indicating a reduction in transmittance during the precipitation of silver, while FIG. 27 shows spectral characteristics representing a recovery of transmittance during dissolution of silver.

Measurements were carried out according to a potential sweeping (cyclic voltammetry: CV) method under the conditions of a sweeping range from −2000 mV to +2500 mV with respect to the potential of silver. Measurements were started at the same potential of silver at a sweeping velocity of 50 mV/second in the order from precipitation to dissolution. Data on spectral characteristics was collected at every 200 mV.

FIGS. 26 and 27 show that the electrolyte of the present invention was used to obtain a good change in transmittance even without adding a reducing agent to the electrolyte. Spectral characteristics of the precipitated silver film of this system indicate that the silver film exerts uniform absorption power in the visible light region and presents a sufficient change in transmittance during both precipitation and dissolution in a similar manner. Also, a sufficient change in transmittance can be obtained even by the use of silver chloride in the amount as small as 50 mmol/liter.

EXAMPLE 16

(Precipitation and Dissolution of Silver Chloride of the Present Invention)

Dimethylamineborane (DMAB) as a reducing agent was further added and dissolved in the RED solution employed in Example 15 so that the concentration would become 500 mmol/liter in order to enhance reversible properties. The RED solution was then poured in the filter. A change in transmittance was measured in a manner similar to Example 15. The results are shown in FIGS. 28 and 29.

Figure 28:
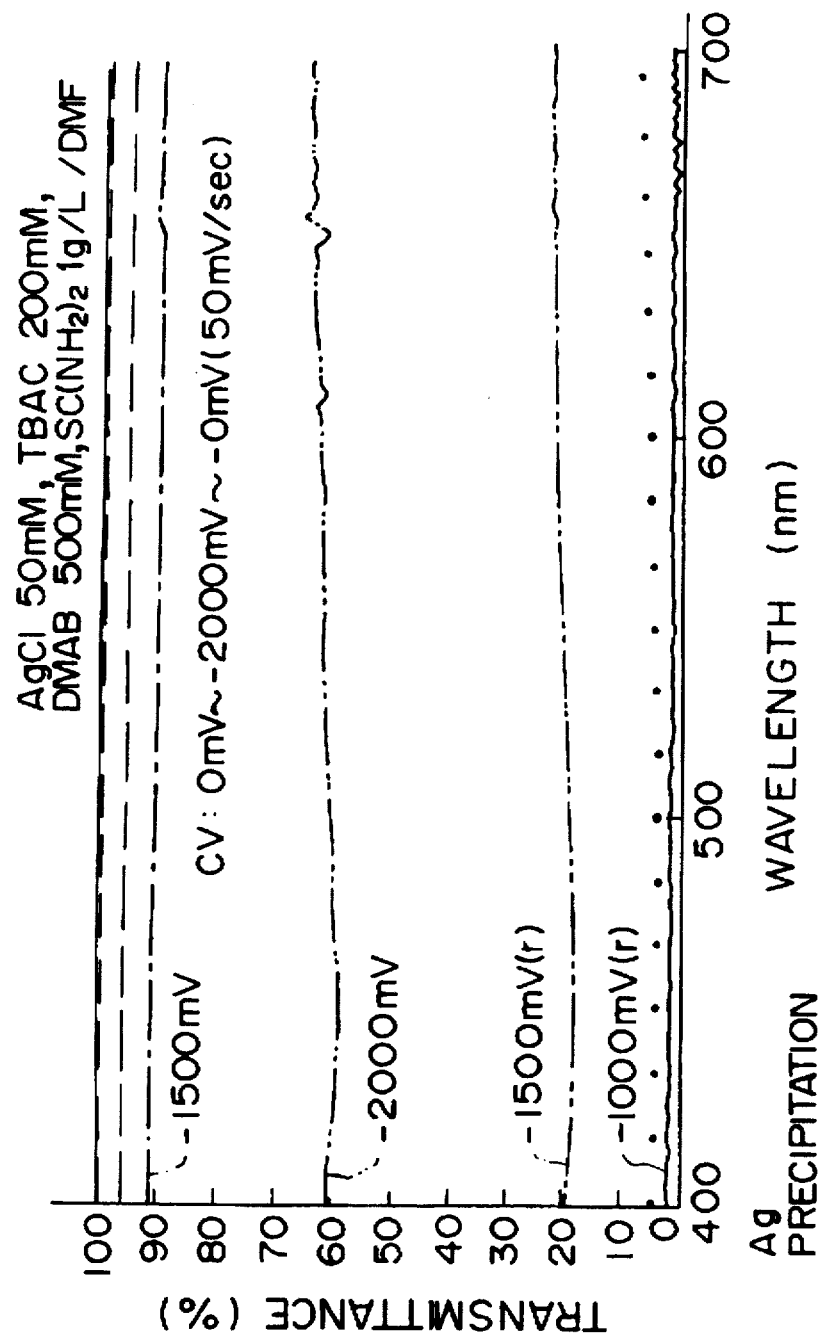
FIG. 28 illustrates spectral characteristics indicating a change in transmittance caused by applying voltages when color-developing of a further optical filter according to the present invention is effected.
Figure 29:
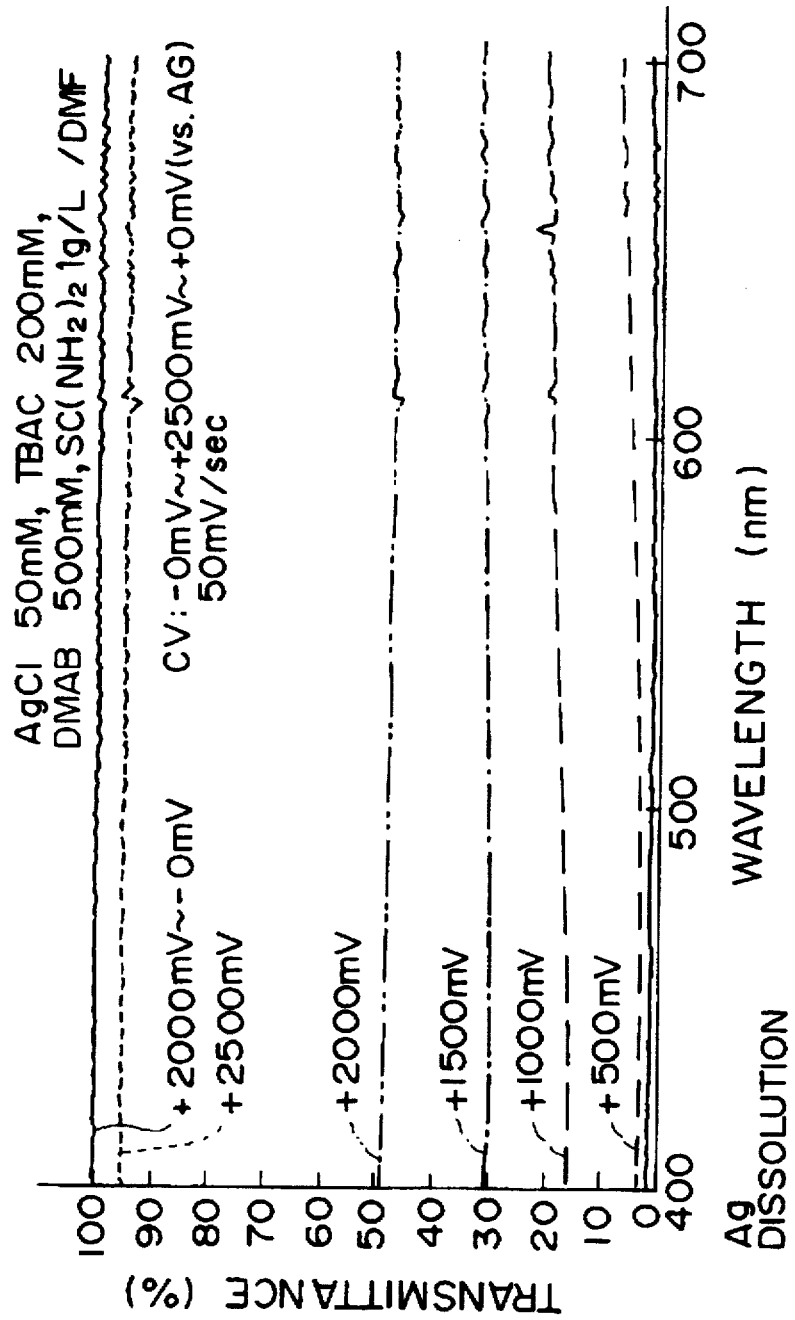
FIG. 29 illustrates spectral characteristics indicating a change in transmittance caused by applying voltages when color-fading of the same optical filter is effected.

FIGS. 28 and 29 show that a better change in the transmittance can be obtained by adding a reducing agent to the electrolyte of the present invention. Spectral characteristics of the precipitated silver film indicate that the silver film has uniform absorption in the visible light region and presents a sufficient change in transmittance during precipitation and dissolution in a similar manner.

EXAMPLE 17

(Precipitation and Dissolution of Silver Bromide (AgBr) of the Present Invention)

Silver bromide was used to consider a system having reversible properties of precipitation and dissolution of silver. In this example, a change in transmittance during both precipitation and dissolution was determined.

Dimethylformamide (DMF) was employed as a solvent. The concentration of silver bromide was 500 mmol/liter. For dissolving silver bromide and for enhancing electrical conductivity, quaternary ammonium salt (tetra-n-butyl ammonium bromide in this example) was dissolved in the solvent so that the concentration would become 1 mol/liter.

Additionally, thiourea [$SC(NH_2)_2$] as a brightening agent was dissolved so that the concentration would become 1.0 g/liter so as to prepare an RED solution, which was then poured in the filter.

A change in transmittance was traced under the following potential conditions. ITO electrodes were used as working electrodes. A silver wire was employed as a reference electrode, and a silver plate was used as a counter electrode.

Figure 30:
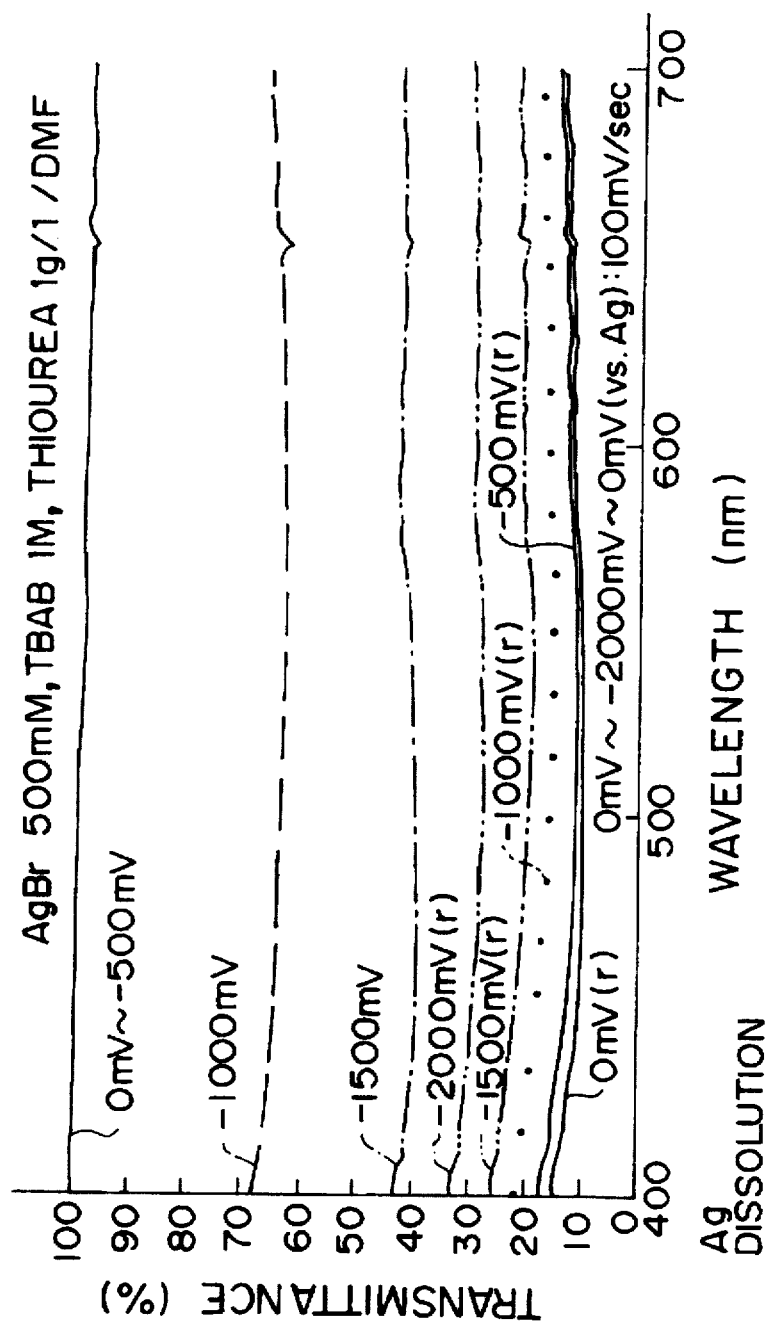
FIG. 30 illustrates spectral characteristics indicating a change in transmittance caused by applying voltages when color-developing of a further optical filter according to the present invention is effected.

FIGS. 30 and 31 show changes in spectral characteristics determined by use of the above-described RED solution (electrolyte). FIG. 30 illustrates spectral characteristics indicating a reduction in transmittance during precipitation of silver, while FIG. 31 shows spectral characteristics representing a recovery of transmittance during dissolution of silver. It should be noted that curves shown above the voltage of −2000 mV or +2000 mV indicate spectral characteristics due to electrolysis generated during the process of potential sweeping (the same will apply to the following description). Also, (r) means that the sweeping potential returns to 0 mV after reaching the maximum of −2000 mV (the same will apply to the following description).

Measurements were carried out according to a potential sweeping (cyclic voltammetry: CV) method under the conditions of a sweeping range from −2000 mV to +2500 mV with respect to the potential of silver. Measurements were started at the same potential of silver at a sweeping velocity of 100 mV/second in the order from precipitation to dissolution. Data on spectral characteristics was collected at every 500 mV.

As is seen from FIGS. 30 and 31, by use of the electrolyte of the present invention, a change in the transmittance substantially equivalent to that by the previously-discussed AgI system can be accomplished.

Spectral characteristics of the precipitated silver film in the AgBr system of the present invention indicate that the silver film has uniform absorption in the visible light region and presents a sufficient change in transmittance in both precipitation and dissolution in a similar manner. The AgBr system is dominant over the AgI system in such characteristics.

EXAMPLE 18

(Precipitation and Dissolution of Silver Bromide of the Present Invention)

As corbic acid (AsA) as a reducing agent was further added and dissolved in the RED solution employed in Example 17 so that the concentration would become 100 mmol/liter in order to enhance reversible properties. The RED solution was then poured in the filter. A change in transmittance was measured in a manner similar to Example 17. The results are shown in FIGS. 32 and 33.

FIGS. 32 and 33 show that a better change in transmittance can be obtained by adding a reducing agent to the electrolyte of the present invention. Spectral characteristics of the precipitated silver film indicate that the film exerts uniform absorption in the visible light region and presents a sufficient change in transmittance during both precipitation and dissolution in a similar manner.

As is seen from the foregoing description, in comparison of the silver chloride system and the silver bromide system of the present invention with the silver iodide, the precipitated silver film obtained by the silver chloride system and the silver bromide system has uniform absorption in the visible light region ($\lambda$=400 to 700 nm), thus exhibiting more excellent uniformity than the silver iodide system. The silver chloride system and the silver bromide system are more advantageous than the silver iodide system, because chlorine gas and bromine gas have greater reference oxidation and reduction potentials (relative to hydrogen) than iodine gas, thus decreasing the amount of side reaction gas generated during dissolution of silver.

EXAMPLE 19

(Low-Temperature Shelf Stability Test on Non-aqueous Solvents)

The freezing points of the various non-aqueous solvents are shown in Table 1. The freezing points of the other types of non-aqueous solvents are as follows: propylene carbonate (PC) at −49.0° C., acetonitrile (AN) at −45.7° C., and γ-butyrolactone (GBL) at −43.5° C. A low-temperature shelf stability test was performed on the respective solvents. The results are shown in Table 3.

TABLE 3

| Solvent Low-temperature Shelf Stability Test (left at −40° C. for 24 hours) AgBr: 500 mmol/liter TBAB: 1 mol/liter SC(NH$_2$)$_2$: 1 g/liter | |
|---|---|
| Solvent | State |
| DMF | Liquid |
| DEF | Liquid |
| DMAA | Partially solidified |
| MPA | Liquid |
| N-MP | Partially solidified |
| MEOH | Liquid |
| EEOH | Liquid |
| PC | Liquid |
| AN | Liquid |
| GBL | Liquid |
| DMSO | Solidified |

Results similar to those obtained by the silver bromide system were attained by use of the silver chloride system.

Although the present invention has been described in its preferred form by way of embodiments, modifications and variations may be made based on the technical concept of the invention.

For example, the types of the above-described RED materials, the composition of the components of the RED solution, the concentration, and the like, may variously be changed. The above-described types of silver salts are not exclusive.

The optical filter having the ITO electrode pattern may be constructed in a manner different from the construction discussed above. Further, the type of the respective components of the filter and the driving method are not limited. For example, the filter may be constructed in such a manner that the electrode pattern shown in FIG. 17 may be changed into the strip-like or lattice-like form. The different types of RED solutions may be poured according to the respective divided electrode portions so that the resultant cells can be disposed. In this case, the RED solution and a conventional EC solution may be combined.

The optical filter of the present invention may be used in a combination with other types of known filter materials (for example, organic electrochromic materials, liquid crystal and electroluminescence materials). The optical filter for adjusting the quantity of light is extensively applicable to various optical systems, for example, an optical aperture for CCD, and can further be used for electrophotographic copying machines, optical communication equipment and the like.

As is clearly understood from the foregoing description, the present invention offers the following advantages.

Based on a concept totally different from conventional EC materials, an RED solution containing silver salt is used as a filter material for adjusting the quantity of light for optical equipment. This solution is employed to form a reversible system that causes precipitation of silver on working electrodes from silver salt and dissolution thereof by controlling the driving operation of the working electrodes (in particular, by means of applying voltages).

It is thus possible to provide a low-powered and non-luminous optical filter suitable for the visible light region by use of the RED materials.

Additionally, all the non-aqueous solvents used for dissolving the above silver salt therein so as to prepare the RED solution have lower freezing points than DMSO. Hence, the RED solution prepared by dissolving silver salt in this type of solvent exhibits excellent low-temperature characteristics and endures the low temperatures, for example, in cold climates.

Further, the precipitated silver film obtained by an electrolyte containing silver chloride or silver bromide has uniform absorption in the visible light region (wavelength ($\lambda$) in a range from 400 to 700 nm), free from a deterioration in image information due to the color inherent in the silver film (filter), which problem is suffered by a system using silver iodide. Moreover, since chlorine gas and bromine gas have greater reference oxidation and reduction potentials (relative to hydrogen) than iodine gas, an electrolyte formed of silver chloride or silver bromide is used to significantly reduce side reaction gas generated during the dissolution of silver.

What is claimed is:

1. An optical apparatus comprising: a first transparent electrode; a second electrode electrically separated from said first electrode; a space between said first and second electrodes; means for providing a driving potential to said first and second electrodes; and an electrolyte in said space, said electrolyte being composed of a solution prepared by dissolving silver salt selected from the group consisting of silver chloride and silver bromide, in a solvent, whereby silver is precipitated and dissolved under over said first and second electrodes under control of said driving potential so as to effect color-developing and color-fading by precipitation and dissolution of silver, respectively, wherein, the solution further comprises at least one type of additive selected from the group consisting of a brightening agent, a complex salt-forming agent and a reducing agent, and the additive is a complex salt-forming agent selected from the group consisting of phthalic acid, succinic acid, salicylic acid and glycolic acid.

2. An optical apparatus according to claim 1, wherein the solution contains the silver salt at a concentration in a range 0.03 to 2.0 mol/liter.

3. An optical apparatus according to claim 1, wherein the brightening agent selected from the group consisting of thiourea, allyl thiourea, mercaptobenzimidazole, and coumarin is used as the additive.

4. An optical apparatus according to claim 1, wherein a complex salt-forming agent selected from group consisting of phthalic acid, succinic acid, salicylic acid and glycolic acid is the additive.

5. An optical apparatus according to claim 1, wherein the solvent is composed of at least one type of compound selected from the group consisting of dimethylformamide, diethylfomamide, N, N-dimethylacetamide, N-methylpropionamide, N-methylpyrrolidone, propylenecarbonate, acetonitrile, 2-ethoxyethanol, 2-methoxyethanol, and γ-butryolactone.

6. An optical apparatus according to claim 1, wherein the solution further comprises a halide supporting salt that provides which dissolves the silver salt so as to transform the silver salt into a complex salt.

7. An optical apparatus according to claim 6, wherein the supporting salt is added at a concentration in a range from one half to five times of one of the silver salt.

8. An electro-deposition light modulating apparatus comprising:

a first transparent electrode;

a second electrode electrically separated from said first electrode;

a means for providing a driving electrical potential to said first and second electrodes;

and an electrolyte comprising:
 (a) non-aqueous solvent contains at least one type of solvent selected from the group consisting of dimethylformamide (DMF), diethylformamide (DEF), N, N-dimethylacetamide (DMAA), N-methylpropionamide (MPA), N-methylpyrrolidone (N-MP), propylenecarbonate (PC), acetonitrile (AN), 2-ethoxyethanol (EEOH), 2-methoxyethanol (MEOH), and π-butryolactone (π-BL);
 (b) silver (complex) salt, in the solvent, whereby silver is deposited and dissolved over said first and second electrodes under control of the driving potential; and
 (c) a reducing agent selected from the group consisting of ascorbic acid and tin chloride.

9. An electro-deposition light modulating apparatus comprising:

a first transparent electrode;

a second electrode electrically separated from said first electrode;

a means for providing a driving electrical potential to said first and second electrodes; and an electrolyte comprising:
 (a) non-aqueous solvent;
 (b) silver (complex) salt in the solvent selected from the group consisting of silver thiocyanide and silver halide, whereby silver is deposited and dissolved over said first and second electrodes under control of the driving potential; and
 (c) a reducing agent selected from the group consisting of ascorbic acid and tin chloride.

10. An electro-deposition light modulating apparatus according to claim 9, wherein said electrolyte contains the silver halide at a concentration in a range from 0.05 to 2.0 mol/liter.

11. An electro-deposition light modulating apparatus comprising:

a first transparent electrode;

a second electrode electrically separated from said first electrode;

a means for providing a driving electrical potential to said first and second electrodes; and an electrolyte comprising:
 (a) non-aqueous solvent;
 (b) silver (complex) salt in the solvent, whereby silver is deposited and dissolved over said first and second electrodes under control of the driving potential;
 (c) reducing agent, including at least one selected from the group consisting of ascorbic acid and tin chloride.

12. An electro-deposition light modulating apparatus according to claim 11, wherein said reducing agent is added at a concentration in a range from one time to 20 times of the silver halide.

13. An electro-deposition light modulating apparatus comprising:

a first transparent electrode;

a second electrode electrically separated from said first electrode;

a means for providing a driving electrical potential to said first and second electrodes; and an electrolyte comprising:
(a) non-aqueous solvent;
(b) silver (complex) salt in the solvent, whereby silver is deposited and dissolved over said first and second electrodes under control of the driving potential;
(c) reducing agent comprising at least one selected from the group consisting of dimethylamineborane, diethylamineborane, trimethylamineborane, and alkali metal salts thereof.

14. An electro-deposition light modulating apparatus according to claim 13, wherein said reducing agent is added at a concentration in a range from 1/150 time to one times of the silver salt.

15. An electro-deposition light modulating apparatus comprising:

a first transparent electrode;

a second electrode electrically separated from said first electrode;

a means for providing a driving electrical potential to said first and second electrodes; and an electrolyte comprising:
(a) non-aqueous solvent;
(b) silver halide in the solvent, whereby silver is deposited and dissolved over said first and second electrodes under control of the driving potential;
(c) supporting salt, that provides a halogen and which dissolves silver halide so as to transform the silver halide into the complex salt potential: and
(d) a reducing agent selected from the group consisting of ascorbic acid and tin chloride.

16. An electro-deposition light modulating apparatus according to claim 15, wherein an anion group of the supporting salt is selected from the group consisting of perchlorate (C104) groups, bromine (Br) groups, an iodine (1) group, hexafluorophosphate(PF6) groups and tetrafluoroborate (BF4) groups.

17. An electro-deposition light modulating apparatus according to claim 16, wherein the supporting salt is added at a concentration in a range from one-half to five times of the silver halide.

18. An electro-deposition light modulating apparatus comprising:

a first transparent electrode;

a second electrode electrically separated from said first electrode;

a means for providing a driving electrical potential to said first and second electrodes; and an electrolyte comprising:
(a) non-aqueous solvent;
(b) silver (complex) salt in the solvent selected from the group consisting of silver chloride and silver bromide, whereby silver is deposited and dissolved over said first and second electrodes under control of the driving potential: and
(c) a reducing agent selected from the group consisting of ascorbic acid and tin chloride.

19. An electro-deposition light modulating apparatus according to claim 18, wherein the solution contains the silver salt at a concentration in a range 0.03 to 2.0 mol/liter.

20. An optical apparatus comprising:

a first transparent electrode;

a second electrode electrically separated from said first electrode;

a space between said first and second electrodes;

means for providing a driving potential to said first and second electrode; and an electrolyte in said space, said electrolyte being composed of a solution prepared by dissolving a silver salt in at least one type of solvent selected from the group consisting of: dimethylformamide, diethylformamide, N, N-dimethylacetamide, N-methylpropionamide, N-methylpyrrolidone, 2-ethoxyethanol, and 2-methoxyethanol, whereby silver is precipitated and dissolved over said first and second electrodes under control of the driving potential so as to effect color-developing and color-fading by the deposition and the dissolution of the silver, respectively, wherein,
the silver salt is silver halide, and
the solution further includes a reducing agent selected from the group consisting of ascorbic acid and tin chloride.

21. An optical apparatus comprising:

a first transparent electrode;

a second electrode electrically separated from said first electrode;

a space between said first and second electrodes;

means for providing a driving potential to said first and second electrode; and an electrolyte in said space, said electrolyte being composed of a solution prepared by dissolving a silver salt in at least one type of solvent selected from the group consisting of: dimethylformamide, diethylformamide, N, N-dimethylacetamide, N-methylpropionamide, N-methylpyrrolidone, 2-ethoxyethanol, and 2-methoxyethanol, whereby silver is precipitated and dissolved over said first and second electrodes under control of the driving potential so as to effect color-developing and color-fading by the deposition and the dissolution of the silver, respectively, wherein,
the silver salt is silver halide at a concentration in a range from 0.05 to 2.0 mol/liter, and
the solution further includes a reducing agent selected from the group consisting of ascorbic acid and tin chloride.

22. An optical apparatus comprising:

a first transparent electrode;

a second electrode electrically separated from said first electrode;

a space between said first and second electrodes;

means for providing a driving potential to said first and second electrode; and an electrolyte in said space, said electrolyte being composed of a solution prepared by dissolving a silver salt in at least one type of solvent selected from the group consisting of: dimethylformamide, diethylformamide, N, N-dimethylacetamide, N-methylpropionamide, N-methylpyrrolidone, 2-ethoxyethanol, and 2-methoxyethanol, whereby silver is precipitated and dissolved over said first and second electrodes under control of the driving potential so as to effect color-developing and color-fading by the deposition and the dissolution of the silver, respectively, and wherein, the solution further includes a reducing agent selected from the group consisting of:

dimethylamineborane, diethylamineborane, trimethylamineborane, and alkali metal salts thereof.

* * * * *